US012428221B2

(12) United States Patent
Chan

(10) Patent No.: US 12,428,221 B2
(45) **Date of Patent: *Sep. 30, 2025**

(54) TRASH LINER RETAINER APPARATUS

(71) Applicant: Erik Chan, Orinda, CA (US)

(72) Inventor: Erik Chan, Orinda, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/303,746

(22) Filed: Apr. 20, 2023

(65) Prior Publication Data

US 2024/0010422 A1 Jan. 11, 2024

Related U.S. Application Data

(63) Continuation-in-part of application No. 17/861,020, filed on Jul. 8, 2022, now Pat. No. 11,661,271.

(51) Int. Cl.
*B65F 1/06* (2006.01)

(52) U.S. Cl.
CPC .................................... *B65F 1/06* (2013.01)

(58) Field of Classification Search
CPC ................................ B65F 1/06; B65F 1/1415
USPC .... 220/495.01, 495.06, 495.05, 495.11, 908, 220/908.1
See application file for complete search history.

(56) References Cited

U.S. PATENT DOCUMENTS

| | | | | |
|---|---|---|---|---|
| 4,913,308 | A | 4/1990 | Culbertson | |
| 5,913,606 | A * | 6/1999 | Nicholson | B65D 33/007 383/62 |
| 5,971,194 | A * | 10/1999 | Freedland | B65F 1/06 220/495.11 |
| 7,980,411 | B2 | 7/2011 | Kasbohm | |
| 11,148,879 | B2 | 10/2021 | Rugg et al. | |
| 11,661,271 | B1 * | 5/2023 | Chan | B65F 1/06 220/495.11 |
| 2008/0000911 | A1 | 1/2008 | Bailey | |

* cited by examiner

*Primary Examiner* — Don M Anderson
*Assistant Examiner* — Elizabeth J Volz
(74) *Attorney, Agent, or Firm* — Evergreen Valley Law Group; Kanika Radhakrishnan

(57) ABSTRACT

Embodiments of the present disclosure provide an apparatus for securing a trash liner. The apparatus includes a retainer channel, a support structure, and a retainer member. A portion of an outer surface of the retainer channel is disposed to at least a portion of an interior surface proximate to an aperture of the support structure. An inner surface of the retainer channel defines an interior space for receiving a mouth portion of the trash liner. One or more engaging members of the retainer channel are adapted to engage the portion of the outer surface of the retainer channel with one or more first complementary engaging members of the portion of the interior surface. A flange member of the retainer member is configured to be removably secured to a portion of the inner surface of the retainer channel for retaining the mouth portion of the trash liner.

22 Claims, 22 Drawing Sheets

TRASH LINER RETAINER APPARATUS

TECHNICAL FIELD

The present disclosure relates to trash liner retainers, and more particularly relates, to an apparatus for retaining a mouth portion of a trash liner disposed in a trash receptacle.

BACKGROUND

Trash receptacles are used for collecting waste matter (e.g., kitchen refuse). Plastic films formed into a trash bag are inserted into the trash receptacle for collecting refuse. Usually, the opening of the trash bag is merely folded over an aperture of the trash receptacle to prevent the disruption of the trash bag containing the refuse material. However, in some scenarios, if the opening of the trash bag is oversized compared to the trash receptacle aperture, the opening of the trash bag has to be tied with a knot for snuggly fitting the trash bag over the trash receptacle aperture. Further, rendering the opening of the trash bag exposed and/or flopping loosely on the trash receptacle creates a messy and unattractive appearance which is undesirable as the primary purpose of a trash receptacle is to store waste in a clean and organized manner.

Many of the trash bags, currently in use, are merely folded over the opening of the trash receptacle. Such an arrangement causes the trash bags to collapse either partially or completely into the trash receptacle, causing interference in disposing of the refuse in the trash bags. Moreover, in such scenarios, a portion of the trash bag may get in contact with the refuse (e.g., liquid waste). As a result, the trash bag and the trash receptacle become unsanitary and require cleaning of the trash receptacle. Due to the unsanitary condition of the trash bag, an individual may get in contact with harmful microorganisms while disposing of the trash bag. Additionally, the trash bag may be susceptible to breakage or tearing due to the stretching of the trash bag while securing the trash bag over the trash receptacle opening.

Therefore, there is a need for an apparatus for securing the opening of the trash bag to overcome one or more limitations stated above in addition to providing other technical advantages.

SUMMARY

Various embodiments of the present disclosure provide trash liner retainer apparatus.

In an embodiment, an apparatus for securing a trash liner is disclosed. The apparatus includes a retainer channel, a support structure, and a retainer member. The retainer channel has an inner surface and an outer surface. A portion of the outer surface of the retainer channel is disposed to at least a portion of an interior surface proximate to an aperture of the support structure. The inner surface defines an interior space within the retainer channel for receiving a mouth portion of the trash liner therein. The retainer channel has one or more engaging members. The one or more engaging members are adapted to engage the portion of the outer surface of the retainer channel with one or more first complementary engaging members disposed to the portion of the interior surface, thereby constraining movement of the retainer channel with respect to the aperture of the support structure. Further, the retainer member includes one or more flange members. Each flange member of the one or more flange members extends downward from a bottom portion of the retainer member and is oriented along a longitudinal axis of the support structure. A flange member of the one or more flange members of the retainer member is configured to be removably secured to a portion of the inner surface of the retainer channel for retaining the mouth portion of the trash liner therebetween, while an unsecured portion of the trash liner disposed within the support structure. The flange member has one or more second complementary engaging members. The one or more second complementary engaging members are adapted to be engaged with the one or more engaging members of the retainer channel, thereby constraining a movement of the retainer member with respect to the retainer channel.

In another embodiment, an apparatus for securing a mouth portion of a trash liner is disclosed. The apparatus includes a retainer channel and a support structure. The retainer channel has an inner surface and an outer surface. A portion of the outer surface of the retainer channel is disposed to at least a portion of an interior surface proximate to an aperture of the support structure. The inner surface defines an interior space within the retainer channel for receiving a mouth portion of the trash liner therein. The retainer channel has one or more engaging members. The one or more engaging members are adapted to engage the portion of the outer surface of the retainer channel with one or more first complementary engaging members disposed to the portion of the interior surface, thereby constraining movement of the retainer channel with respect to the aperture of the support structure. The apparatus further includes a pair of flexible retainer members. The pair of flexible retainer members includes a first flexible retainer member and a second flexible retainer member. The first flexible retainer member is mounted to a first sidewall of a pair of sidewalls of the retainer channel. The second flexible retainer member is mounted to a second sidewall of the pair of sidewalls of the retainer channel. Each of the first flexible retainer member and the second flexible retainer member is mounted in a manner that a portion of the first and second flexible retainer members is oriented parallel to a base surface of the retainer channel. The first flexible retainer member has one or more second complementary engaging members adapted to be engaged with the one or more engaging members of the retainer channel, thereby providing constraint to the movement of the first flexible retainer member with respect to the retainer channel. Further, a free end of the first and second flexible retainer members is facing each other and positioned in close proximity, thus defining a gap therebetween. Furthermore, the first and second flexible retainer members are operated between a collapsed form and a retracted form for retaining the mouth portion of the trash liner within the interior space of the retainer channel.

In yet another embodiment, an apparatus for securing a mouth portion of a trash liner is disclosed. The apparatus includes a retainer channel and a support structure. The retainer channel has an inner surface and an outer surface. A portion of the outer surface is disposed to at least a portion of an interior surface proximate to an aperture of a support structure. The inner surface defines an interior space within the retainer channel for receiving the mouth portion of the trash liner therein. The retainer channel has one or more engaging members. The one or more engaging members are adapted to engage the portion of the outer surface of the retainer channel with one or more complementary engaging members of the interior surface proximate to the aperture of the support structure, thereby constraining movement of the retainer channel with respect to the aperture of the support structure. The apparatus further includes a retainer member.

The retainer includes one or more flange members. Each flange member of the one or more flange members extends downward from a bottom portion of the retainer member and is oriented along a longitudinal axis of the support structure. The retainer member is configured based on a geometric design of the retainer channel for enabling a snug fit between the retainer member and the retainer channel. Further, the retainer member is configured to removably secure to the retainer channel for retaining the mouth portion of the trash liner therebetween, while an unsecured portion of the trash liner is disposed within the support structure. Furthermore, one or more flange members of the retainer member abut the inner surface of the retainer channel for removably securing the retainer member to a top portion of the retainer channel.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various example embodiments of the present disclosure are described hereinafter with reference to FIGS. 1A-1E to FIGS. 6A-6C.

Figure 1A:
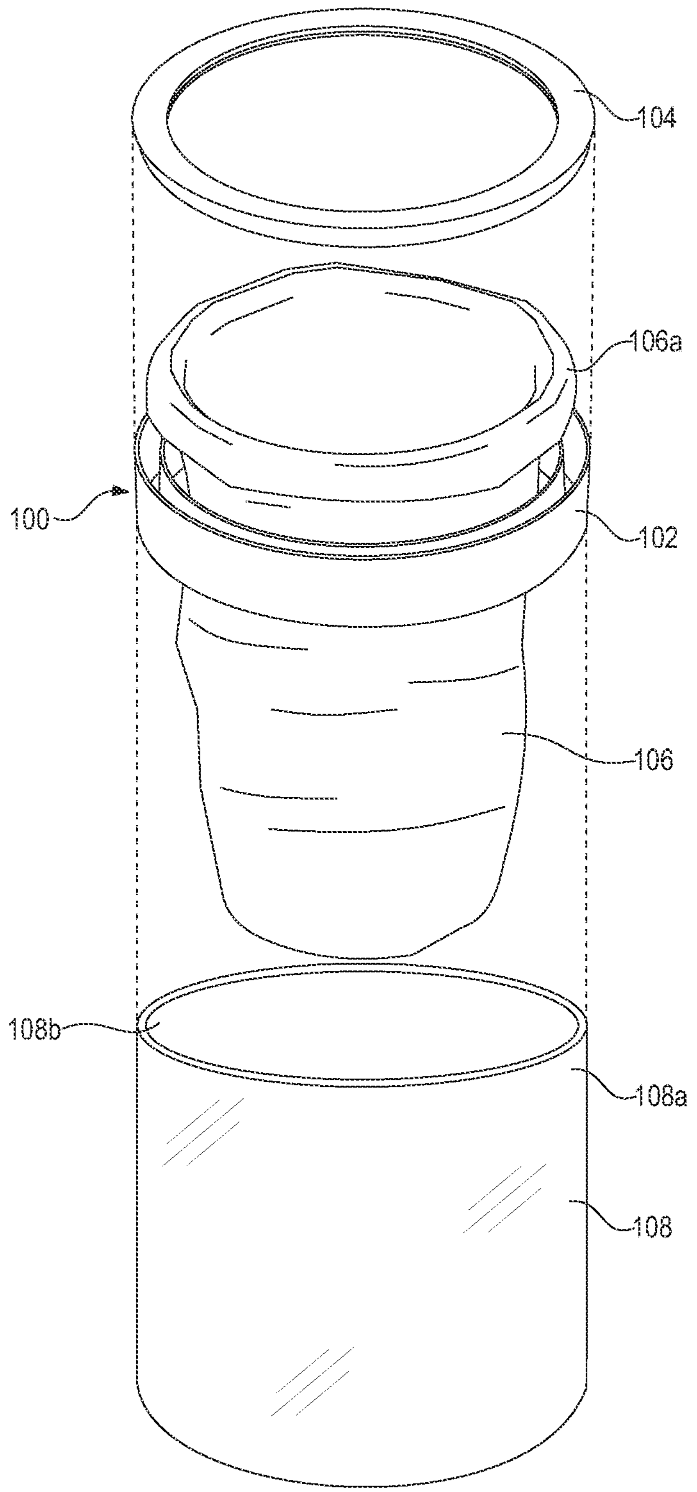
FIG. 1A illustrates an exploded view of an apparatus for retaining a mouth portion of a trash liner, in accordance with an embodiment of the present disclosure.

FIG. 1A illustrates an exploded view of an apparatus 100 for retaining a trash liner 106, in accordance with an embodiment of the present disclosure. The apparatus 100 includes a retainer channel 102 and a retainer member 104. The apparatus 100 including the retainer channel 102 and the retainer member 104 is configured to retain a mouth portion 106*a* of the trash liner 106.

The trash liner 106, made from plastic films, paper, or other flexible sheet material, can be disposed (e.g., mounted, placed, positioned, secured, etc.) within a support structure 108 for collecting waste matter (or refuse). For example, the support structure 108 may be a trash receptacle. Typically, the mouth portion 106*a* referenced for the open edge or an opening of the trash liner 106 is secured in the retainer channel 102 by removably engaging the retainer member 104. More specifically, the retainer channel 102 is substantially disposed at a top portion 108*a* of the support structure 108 (hereinafter interchangeably referred to as 'the trash receptacle 108'). Moreover, the retainer channel 102 is dimensioned corresponding to the dimensions of the top portion 108*a* of the trash receptacle 108 for snuggly fitting the retainer channel 102 to the trash receptacle 108. The mouth portion 106*a* of the trash liner 106 is stuffed in the retainer channel 102. Thereafter, the retainer member 104 is removably secured to the retainer channel 102 for retaining the mouth portion 106*a* of the trash liner 106 therein, while the remaining portion of the trash liner 106 is disposed within the trash receptacle 108. As a result, the trash liner 106 disposed in the trash receptacle 108 eliminates manual intervention involved in cleaning the trash receptacle 108. Additionally, usage of the trash liner 106 in the trash receptacle 108 ensures the hygiene of the trash receptacle 108, and hence a user and/or an individual is able to safely dispose of the trash liner 106.

Figure 1B:
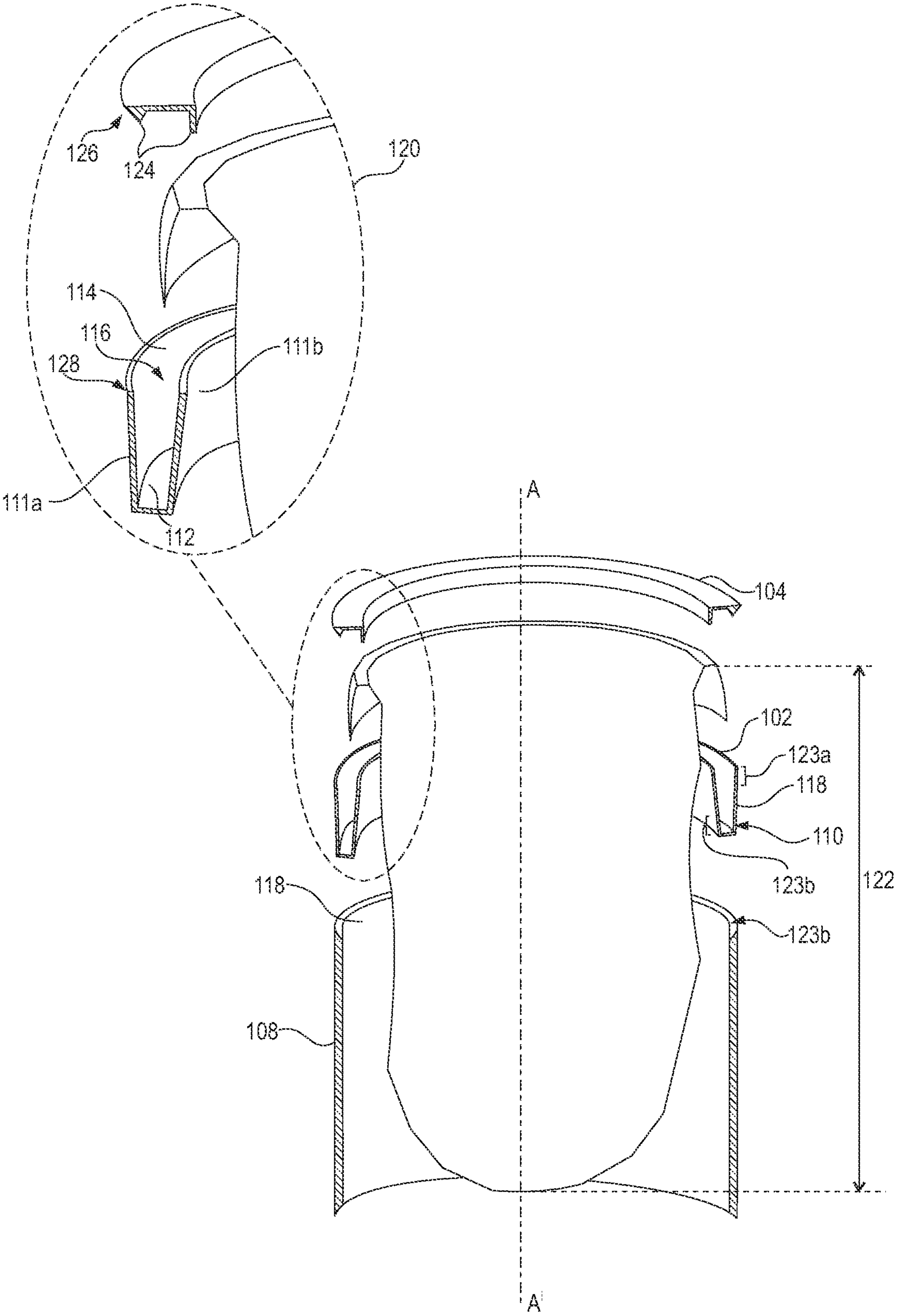
FIG. 1B illustrates a sectional view of the apparatus of FIG. 1A and an enlarged portion thereof depicting a portion of a retainer channel, a retainer member, and the trash liner, in accordance with an embodiment of the present disclosure.

Referring to FIG. 1B, is a sectional view of the apparatus 100, in accordance with an embodiment of the present disclosure. As shown, the retainer channel 102 is configured with a U-shaped structure. It will be apparent that the U-shaped structure of the retainer channel 102 includes a pair of sidewalls 110 and a base surface 112. The pair of sidewalls 110 includes a first sidewall 111*a* and a second sidewall 111*b* (see, an enlarged portion 120 of FIG. 1B). As such, each of the first sidewall 111*a* and the second sidewall 111*b* extends from opposite sides of the base surface 112 along its length. It is to be noted that the first sidewall 111*a* and the second sidewall 111*b* of the retainer channel 102 align roughly parallel to a longitudinal axis A-A'. The longitudinal axis A-A' corresponds to a vertical axis of the trash receptacle 108. Further, the retainer channel 102 includes an inner surface 114 and an outer surface 115 (see, the enlarged portion 120 of FIG. 1B). The inner surface 114 defines an interior space 116 (see, the enlarged portion 120) within the retainer channel 102. In other words, the area bounded by the first sidewall 111*a*, the second sidewall 111*b*, and the base surface 112 refers to the interior space 116 of the retainer channel 102.

In an embodiment, the first sidewall 111*a* and the second sidewall 111*b* may be detachably coupled to the opposite ends of the base surface 112 via conventional mounting means to form the U-shaped structure of the retainer channel 102. For example, the base surface 112 may be configured with the first sidewall 111*a* and the second sidewall 111*b* through a snap-fit arrangement. The snap-fit arrangement allows detachable mounting of the first sidewall 111*a* and the second sidewall 111*b* to the base surface 112. Alternatively, the first sidewall 111*a* and the second sidewall 111*b* may be mounted to the base surface 112 using glue or any other fastening means as per the design feasibility and requirement. In another embodiment, the first sidewall 111*a* and the second sidewall 111*b* may be configured in a manner to form a V-shaped structure or any other structural configuration as per design feasibility and requirement.

The retainer channel 102 including the interior space 116 is configured to receive the mouth portion 106*a* of the trash liner 106 therein. More specifically, a portion 123*a* of the outer surface 115 of the retainer channel 102 is disposed to at least a portion 123*b* of an interior surface 118 proximate to an aperture (see, 108*b* of FIG. 1A) of the trash receptacle 108. As explained above, the outer surface 115 of the retainer channel 102 is dimensioned in conformity with the dimensions of the interior surface 118 of the trash receptacle 108 to ensure a snug fit between the retainer channel 102 and the trash receptacle 108. In other words, the trash receptacle 108 may be configured with thickness. To that effect, the outer surface 115 of the retainer channel 102 is configured based on an inner perimeter of the aperture 108*b*, thereby allowing a snug fit between the outer surface 115 of the retainer channel 102 and the trash receptacle 108.

In an illustrated embodiment, the retainer channel 102 has a solid structure designed at least to sustain a load acted thereupon. The load acted on the retainer channel 102 may be at least a compressive load, a bending load, a shear load, or a combination of the compressive load, the bending load, and the shear load. In another embodiment, other suitable structures such as, but not limited to a hollow structure, a frame structure, a weave structure, a honeycomb structure, or any combination thereof can also be used. Further, the structure of the first sidewall 111*a*, the second sidewall 111*b*, and the base surface 112 of the retainer channel 102 may have the same or different configuration. In one example, the first sidewall 111*a* of the retainer channel 102 may be configured with the solid structure, whereas, the second sidewall 111*b* and the base surface 112 of the retainer channel 102 may be configured with the frame structure that satisfies desired functionality. In another example, the first sidewall 111*a* may be configured with the weave structure, the second sidewall 111*b* may be configured with the solid structure, and the base surface 112 may be configured with the frame structure that satisfies desired functionality.

The retainer channel 102 may be made of flexible material such as, but not limited to, high-density polythene, thermoplastic, polycarbonate sheets, and the like. It is to be noted that the retainer channel 102 configured with the flexible materials should possess adequate breakage strength for allowing elastic deformation of the retainer channel 102 during its usage. Thus, the retainer channel 102 may be distorted while securing the retainer channel 102 to the trash receptacle 108. It will be apparent that the outer surface 115 of the retainer channel 102 assumes its original state upon releasing pressure on the retainer channel 102, thus ensuring a snug fit between the outer surface 115 of the retainer channel 102 and the trash receptacle 108.

Figure 1C:
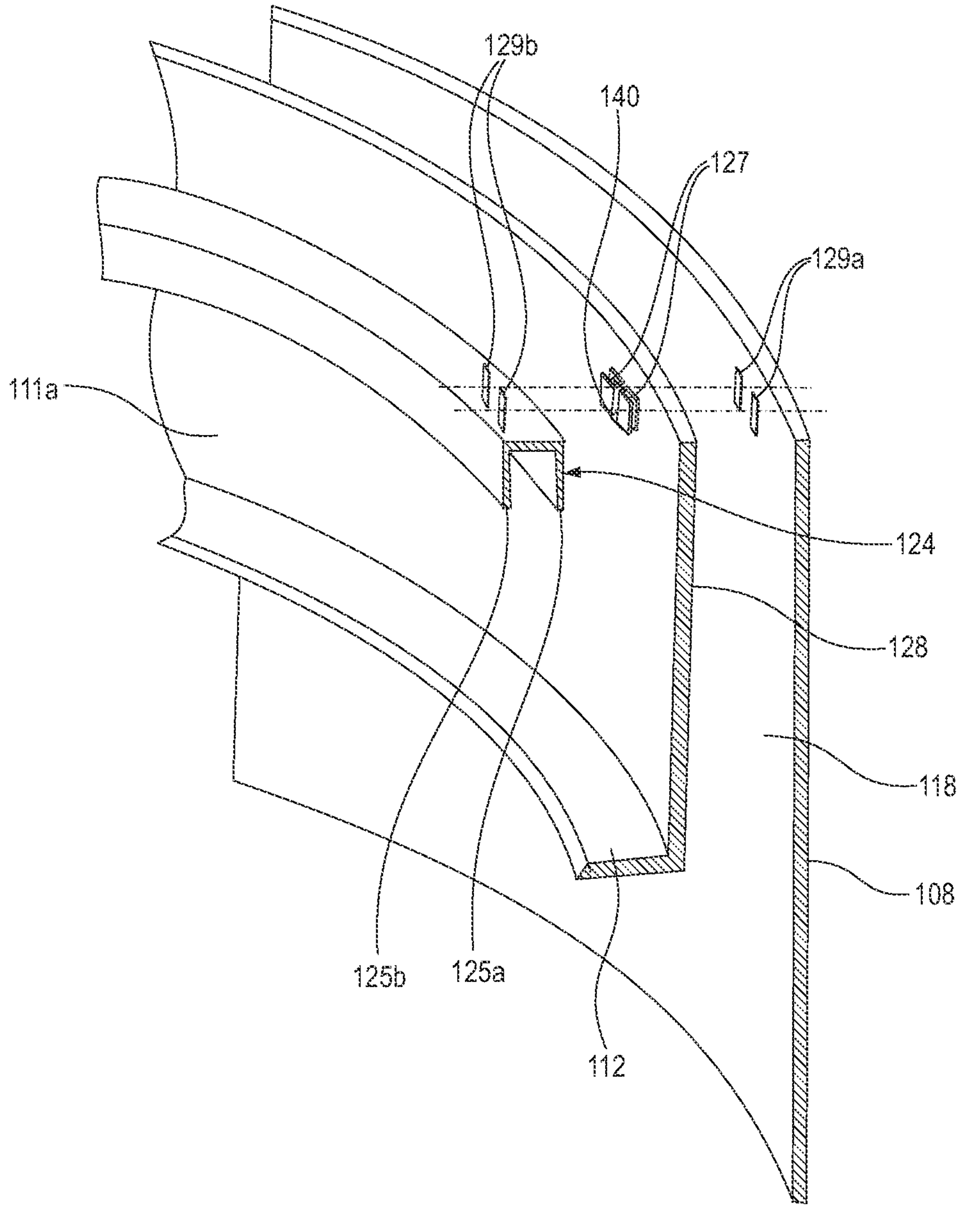
FIG. 1C illustrates an exploded view of an assembly of a first sidewall of the retainer channel with the retainer member and a support structure of FIG. 1B, in accordance with one embodiment of the present disclosure.
Figure 1D:
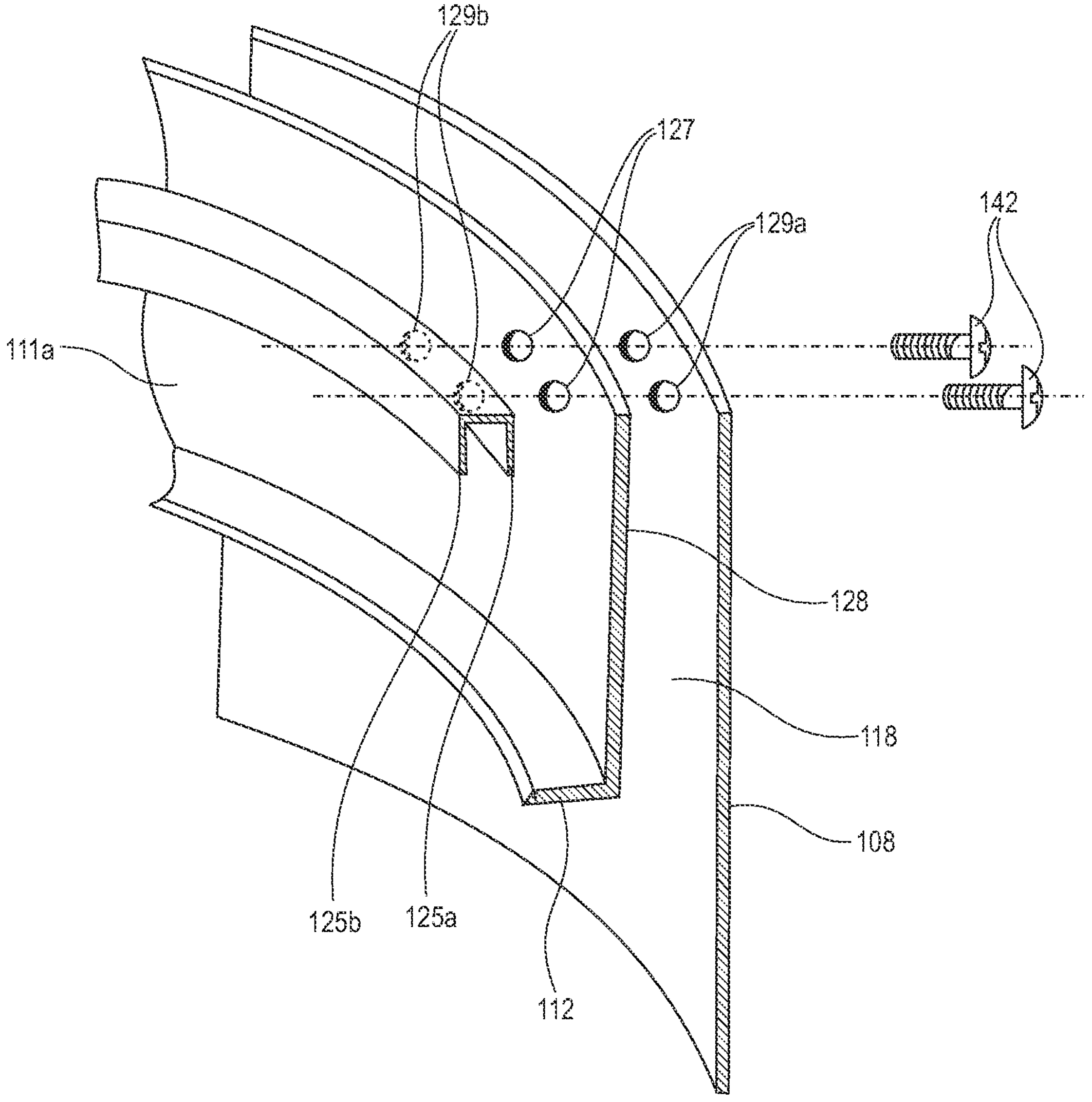
FIG. 1D illustrates an exploded view of the assembly of the first sidewall of the retainer channel with the retainer member and the support structure of FIG. 1B, in accordance with another embodiment of the present disclosure.

Further, retainer channel 102 includes one or more engaging members 127 (shown in FIGS. 1C and 1D). More specifically, the first sidewall 111*a* of the retainer channel 102 has the one or more engaging members 127. The one or more engaging members 127 are adapted to engage a portion of an outer surface 121 of the first sidewall 114*a* of the retainer channel 102 with one or more first complementary engaging members 129*a* of a portion of the interior surface 118 proximate to the aperture 108*b* of the support structure 108. As a result, the one or more engaging members 127 and the one or more first complementary engaging members 129*a* constrain movement of the first sidewall 114*a* of the retainer channel 102 with respect to the aperture 108*b* of the support structure 108.

Figure 1E:
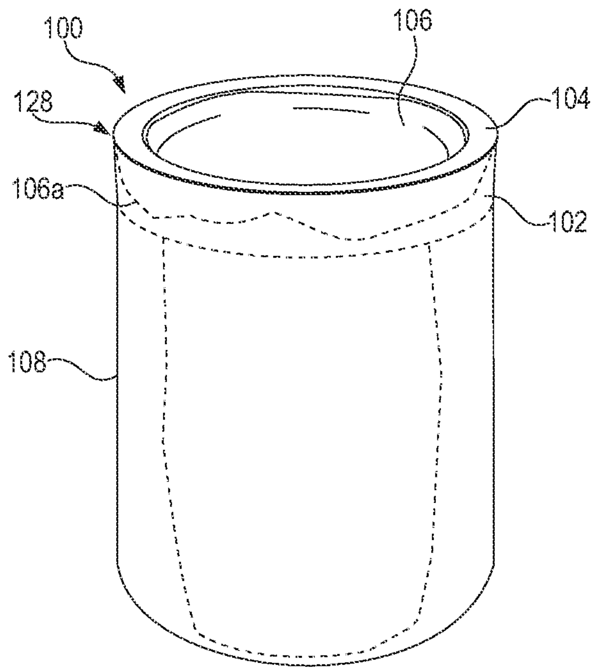
FIG. 1E is a schematic representation of the apparatus of FIG. 1A disposed within a support structure, in accordance with an embodiment of the present disclosure.

In use, the mouth portion 106*a* of the trash liner 106 is received in the interior space 116 of the retainer channel 102. More specifically, the mouth portion 106*a* is folded over the first sidewall 114*a* and the second sidewall 114*b* and inserted into the interior space 116 formed by the first sidewall 114*a*, the second sidewall 114*b*, and the base surface 112. Thereafter, the retainer member 104 is removably secured to the retainer channel 102 for retaining the mouth portion 106*a* within the interior space 116, while an unsecured portion 122 of the trash liner 106 is disposed within the trash receptacle 108 (as shown in FIG. 1E). The unsecured portion 122 corresponds to a portion of the trash liner 106 extending within the support structure 108.

Further, the retainer member 104 includes one or more flange members 124 (i.e., a first flange member 125*a* and a second flange member 125*b*). Each of the first flange member 125*a* and the second flange member 125*b* extends from a bottom portion 126 of the retainer member 104 and is oriented along the longitudinal axis A-A' (best shown in FIG. 1B). In other words, the first flange member 125*a* and a second flange member 125*b* are extended from opposite ends of the bottom portion 126 of the retainer member 104 (see, the enlarged portion 120 of FIG. 1B). In an embodiment, the length dimension of the second flange member 125*b* may be greater than the first flange member 125*a* (as shown in FIG. 1B). Alternatively, each of the first flange member 125*a* and the second flange member 125*b* may be configured with a similar length dimension or any other configuration as per design feasibility and requirement.

Furthermore, the retainer member 104 includes one or more second complementary engaging members 129*b* (shown in FIGS. 1C and 1D). More specifically, the first flange member 125*a* of the retainer member 104 has one or more second complementary engaging members 129*b*. The one or more second complementary engaging members 129*b* are adapted to be engaged with the one or more engaging members 127 of the retainer channel 102, thereby constraining movement of the retainer member 104 with respect to the retainer channel 102.

In one embodiment, the one or more engaging members 127, the one or more first complementary engaging members 129*a*, and the one or more second complementary engaging members 129*b* may be adhesive tapes. More specifically, the one or more engaging members 127 are a first set of adhesive tapes, the one or more first complementary engaging members 129*a* are a second set of adhesive tapes, and the one or more second complementary engaging members 129*b* are a third set of adhesive tapes. As shown in FIG. 1C, a slot 140 is formed on the first sidewall 111*a* of the retainer channel 102 to secure the first set of adhesive tapes to both an inner surface 121*a* and an outer surface 121*b* of the first sidewall 111*a* of the retainer channel 102. In the illustrated embodiment, the slot 140 has a rectangular shape configured to be bounded by the first set of adhesive tapes to both an inner surface 121*a* and an outer surface 121*b* of the first sidewall 111*a*. However, in another embodiment, the slot 140 may be configured with other shapes such as circular, square, hexagonal, etc. Corresponding to the first set of adhesive tapes, the second set of adhesive tapes is bound to the portion of the interior surface 118 proximate to the aperture 108*b* of the support structure 108, and the third set of adhesive tapes is bound to the outer surface of the first flange member 125*a*. The first set of adhesive tapes, the second set of adhesive tapes, and the third set of adhesive tapes used herein are both-sided adhesive tapes designed to adhesively engage the retainer channel 102 with the first flange member 125*a* and the aperture 108*b* of the support structure 108. Each of the first set of adhesive tapes, the second set of adhesive tapes, and the third set of adhesive tapes may be made up of suitable material such as paper, rubber, plastic film, cloth, metal foil, etc., and suitable adhesive may be coated on both the sides.

In another embodiment, the one or more engaging members 127 of the first sidewall 111*a* of the retainer channel 102, the one or more first complementary engaging members 129*a* of the portion of the interior surface 118 proximate to the aperture 108*b* of the support structure 108, and the one or more second complementary engaging members 129*b* of the first flange member 125*a* may be fastener receiving members (as shown in FIG. 1D). The fastener receiving members are adapted to receive fasteners 142, thereby engaging the first sidewall 114*a* of the retainer channel 102 with the portion of the interior surface 118 proximate to the aperture 108*b* of the support structure 108 and the first flange member 125*a* of the retainer member 104. In the illustrated embodiment, the fasteners 142 are screws and the fastener receiving members are holes. The holes may be provided with a thread profile complementary to the thread profile of the screws to hold and tighten screws securely. It should be noted that the fasteners used herein are not limited to the screws, the other type of fasteners such as, but not limited to, nut and bolt, clips, rivets, studs, eye bolts, and the like, can also be used.

In one implementation, the first flange member 125*a* and the second flange member 125*b* are configured at the bottom portion 126 and may extend along the length of the retainer member 104 (as shown in FIGS. 1A and 1B), thus forming a unified structure of the retainer member 104. In another implementation, the first flange member 125*a* and the second flange member 125*b* may be detachably mounted at the bottom portion 126 via conventional fastening means to form the retainer member 104. In another implementation, the first flange member 125*a* and the second flange member 125*b* may be configured as segments spaced at regular separations at the bottom portion 126 along its length (not shown in figures).

The retainer member 104 has the solid structure designed removably secured to the retainer channel 102 for retaining the mouth portion 106*a* within the interior space 116 (shown in FIGS. 1B, 1C, and 1D). In another embodiment, other suitable structures such as, but not limited to the hollow structure, the frame structure, the weave structure, the honeycomb structure, or any combination thereof can also be used. Further, the structure of the first flange member 125*a* and the second flange member 125*b* of the retainer member 104 may have different configurations. In one example, the first flange member 125*a* of the retainer member 104 may be configured with the solid structure, whereas, the second flange member 125*b* of the retainer member 104 may be configured with the frame structure that satisfies the desired functionality. In another example, the first flange member 125*a* may be configured with the weave structure, and the second flange member 125*b* may be configured with the frame structure that satisfies the desired functionality.

Further, the retainer member 104 may be made of flexible materials similar to the retainer channel 102. Thus, the retainer member 104 may exhibit similar mechanical properties as that of the retainer channel 102. Particularly, the retainer member 104 including the first flange member 125*a* and the second flange member 125*b* abuts the inner surface 114 of the retainer channel 102 while removably securing the retainer member 104 to a top portion 128 of the retainer channel 102 (shown in FIG. 1E). Moreover, the retainer member 104 is configured based on a geometric design of the retainer channel 102, thereby enabling a snug fit between the retainer member 104 and the retainer channel 102. For example, the geometric design of the retainer channel 102 is selected to be one of a circular/oval shape (as shown in FIGS. 1A and 1E). The geometric design of the retainer channel 102 and the retainer member 104 is configured corresponding to the shape of the aperture 108*b* and/or the geometric design of the top portion 108*a* of the trash receptacle 108. This configuration of the apparatus 100 enables the snug fit between the retainer channel 102 and the trash receptacle 108. In some embodiments, the structural configuration of the retainer channel 102, the retainer member 104, and the support structure 108 may be configured in various geometric designs such as, but not limited to, oval, square, hexagon, pentagon, rectangular, rectangular with rounded corners, or any other geometric or organic shapes, which serve the purposes.

Moreover, the retainer member 104 snuggly fits onto the top portion 128 of the retainer channel 102 due to a similar geometric design (as shown in FIG. 1C). In an embodiment, the retainer member 104 may be removably secured to the top portion 128 of the retainer channel 102 via conventional fastening means such as a snap-fit arrangement, or the like. As such, removably securing the retainer member 104 onto the top portion 128 of the retainer channel 102 conceals the mouth portion 106*a* therein (as shown in FIG. 1C). Further, the mouth portion 106*a* retained within the interior space 116 eliminates the loose flopping of the mouth portion 106*a* and enhances the aesthetic appeal. Furthermore, the retainer member 104 is detached from the retainer channel 102 for disposal when the trash liner 106 is filled with refuse.

In one embodiment, the support structure 108 (or the trash receptacle 108) may be configured with a freeform shape (i.e. irregular or asymmetrical design). In this case, the retainer channel 102 may be configured to align with the perimeter (either interior or exterior perimeter) of the support structure 108 due to its elastic property, thereby securing the retainer channel 102 to the trash receptacle 108.

Figure 1F:
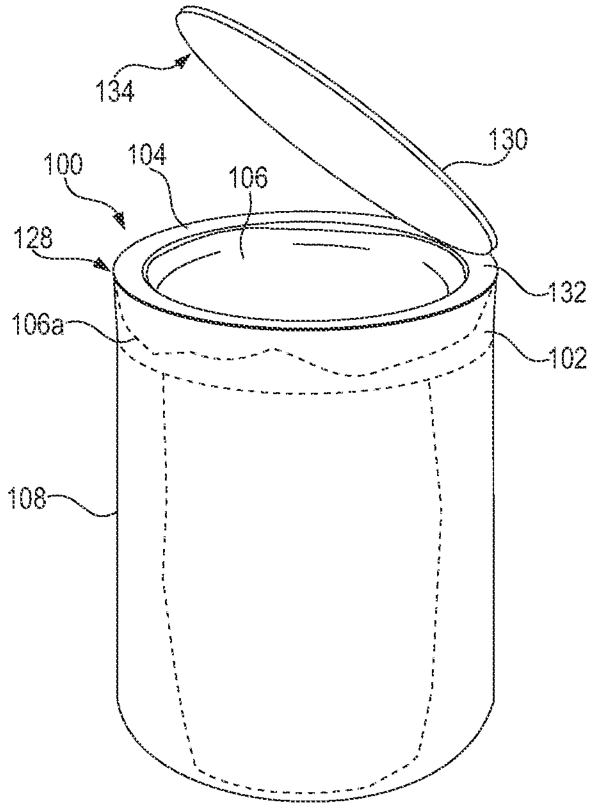
FIGS. 1F and 1G, illustrate a schematic representation of the apparatus of FIG. 1A, depicting a lid of the retainer member operable between an open position and a closed position, in accordance with an embodiment of the present disclosure.
Figure 1G:
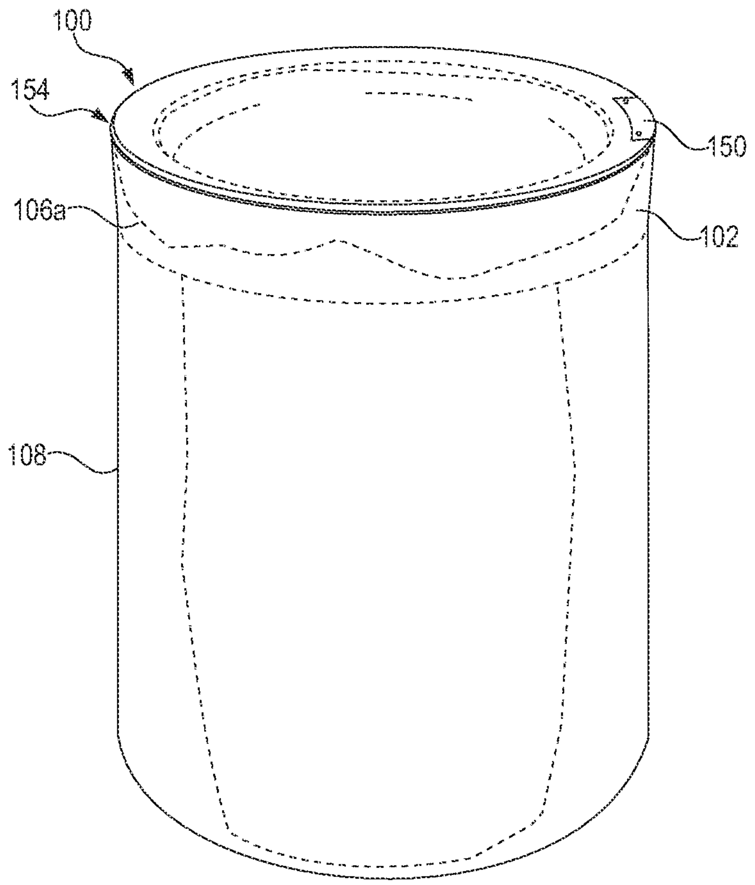

In an embodiment, the retainer member 104 may be configured with a lid 130 (as shown in FIG. 1F). The lid 130 may be secured to one end of a top portion 132 of the retainer member 104. The lid 130 may be secured to the retainer member 104 via a hinge mechanism (see, 138 of FIG. 1G). In an embodiment, the lid 130 may be secured to the retainer member 104 using any other conventional means. The lid 130 may be made of flexible materials as explained above. The lid 130 may be operated in an open position (see, 132), prior to securing the mouth portion 106*a* of the trash liner 106 (as shown in FIG. 1F). Further, the lid 130 may be operated to a closed position (see, 136) upon securing the retainer member 104 atop the supporting structure 108 (as shown in FIG. 1G). It is to be noted that the lid 130 operated in the closed position 136 helps in maintaining the hygiene of the surrounding environment while the trash is being stored in the trash liner 106 is disposed in the trash receptacle 108.

Figure 2A:
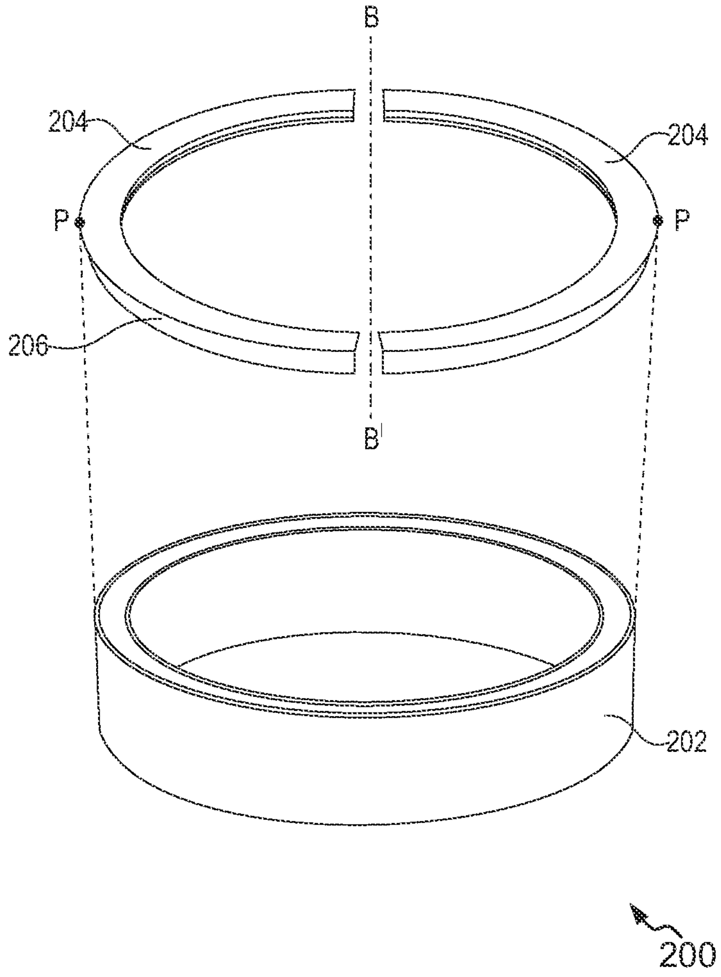
FIG. 2A is a schematic representation of an apparatus for securing the mouth portion of the trash liner, in accordance with an embodiment of the present disclosure.
Figure 2B:
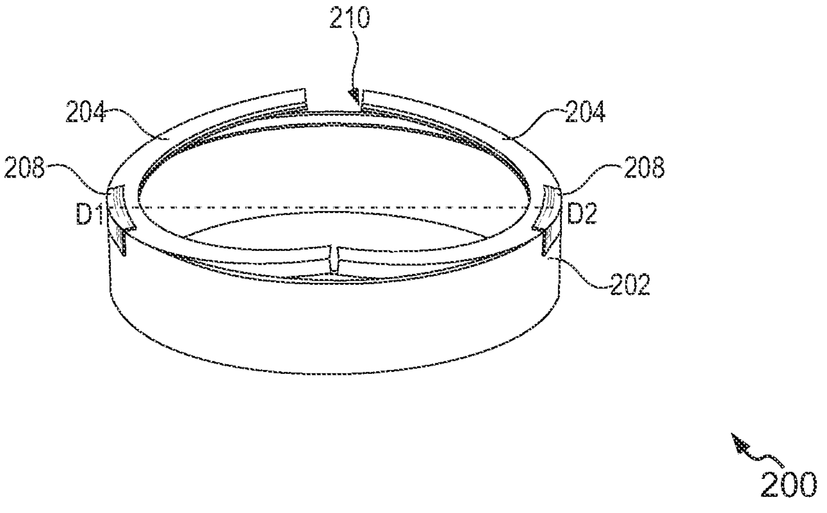
FIG. 2B is a schematic representation of the apparatus of FIG. 2A operated in an open position for receiving the mouth portion of the trash liner, in accordance with an embodiment of the present disclosure.

Referring to FIG. 2A, the apparatus 200 includes a retainer channel 202 and a retainer member 204. The configuration of the retainer channel 202 is similar to the configuration of the retainer channel 102 of FIG. 1A, and therefore it is not explained in detail for the sake of brevity. As shown in FIG. 2A, the retainer member 204 configured in the geometric design of a circular shape may be partitioned along an axis B-B' into two semi-circular segments (or two symmetrical segments). In this configuration, each segment of the retainer member 204 may be hingedly coupled to the retainer channel 202. More specifically, a point P on each semi-circular segment of the retainer member 204 defines the one line of symmetry (or reflection symmetry) of the semi-circular segment of the retainer member 204. Thus, point P may be considered the mounting point of the semi-circular segment of the retainer member 204. The retainer member 204 may be temporarily mounted to the retainer channel 202 at the point P via a hinge mechanism (see, 208 of FIG. 2B). Particularly, the point P of each semi-circular segment of the retainer member 204 may be secured with one part of the hinge mechanism 208. Further, the point P of each of the semi-circular segments of the retainer member 204 is positioned at diametrically opposite ends (represented as D1 and D2) of the retainer channel 202. Thereafter, each semi-circular segment of the retainer member 204 is secured to the retainer channel 202 via the hinge mechanism 208 (as shown in FIG. 2B). The retainer member 204 hingedly coupled to the retainer channel 202 is operable between an open position (see, 210 of FIG. 2B) and a closed position (see, 212 of FIG. 2C).

Figure 2C:
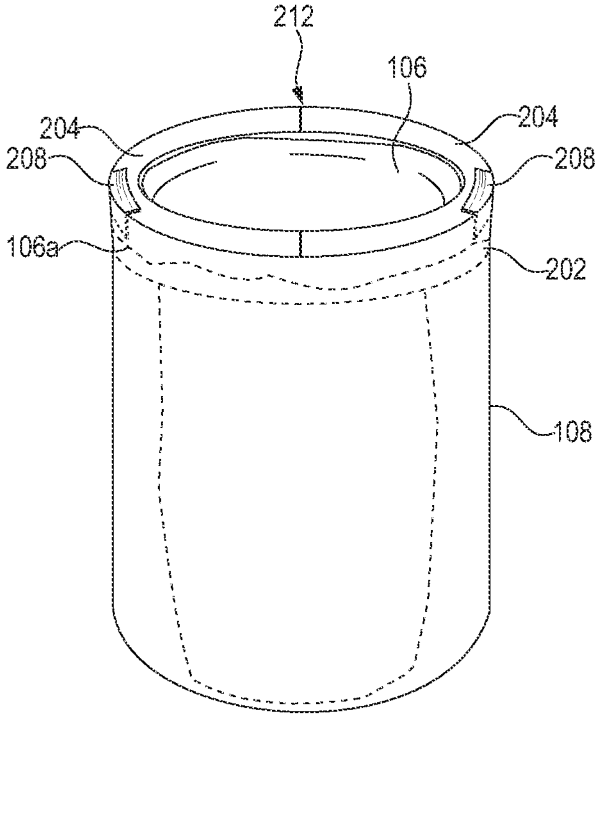
FIG. 2C is a schematic representation of the apparatus of FIG. 2A operated in a closed position for retaining the mouth portion of the trash liner, in accordance with an embodiment of the present disclosure.

In use, the retainer channel 202 hingedly coupled to the retainer member 204 may be disposed in the trash receptacle 108. The hinge mechanism 208 may include flex hinges of negligible thickness. Thus, the hinge mechanism 208 prevents hindrance to the apparatus 200 while securing the apparatus 200 to the trash receptacle 108. In other words, the hinge mechanism 208 adapts suitably for securing the retainer channel 202 to the trash receptacle 108. It is to be noted that the functionality of the hinge mechanism 208 is not affected, upon securing the retainer channel 202 to the trash receptacle 108. Further, the retainer member 204 (both the semi-circular segments) is operated in the open position 210 for allowing insertion of the mouth portion 106*a* of the trash liner 106 within the retainer channel 202. It is to be noted that the hinge mechanism 208 (e.g., the flex hinges)

provides a sufficient degree of movement for operating the retainer member 204 in the open position 210 in order to allow insertion of the mouth portion 106*a* of the trash liner 106 within the retainer channel 202. Further, upon securing the mouth portion 106*a* within the retainer channel 202, the retainer member 204 is operated in the closed position 212 (as shown in FIG. 2C). More specifically, the retainer member 204 includes one or more flange members (see, 206 of FIG. 2A) of the retainer member 204 similar to the retainer member 104. The flange members 206 abuts the inner surface of the retainer channel 202 while securing the retainer member 204 to the retainer channel 202 (or operated in the closed position 212).

Figure 3A:
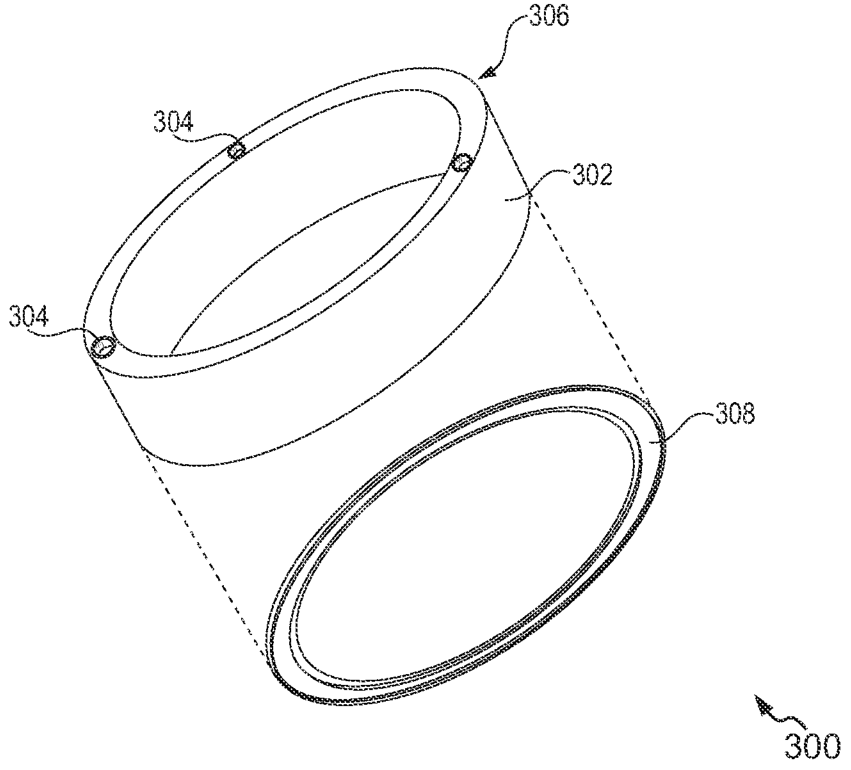
FIG. 3A illustrates an exploded bottom perspective view of an apparatus for securing the mouth portion of the trash liner, in accordance with an embodiment of the present disclosure.

FIG. 3A illustrates an exploded bottom perspective of an apparatus 300 for securing the mouth portion 106*a* of the trash liner 106, in accordance with an embodiment of the present disclosure. The apparatus 300 includes a retainer channel 302 and a retainer member 308. The retainer channel 302 and the retainer member 308 are similar to the retainer channel 102 and the retainer member 104, respectively. As shown, the retainer channel 302 is configured with a plurality of slots 304 (exemplarily depicted to be three slots) at regular intervals at a bottom portion 306 of the retainer channel 302. The slots 304 allow insertion of one ends 310*a* of a plurality of elongated tubular structures 310. The dimensions of the elongated tubular structures 310 are configured in conformity with the dimensions of the slots 304 for allowing a snug fit of the elongated tubular structures 310 within the slots 304. In an embodiment, the bottom portion 306 of the retainer channel 302 may be permanently affixed with the elongated tubular structures 310. It is to be noted that the number of the elongated tubular structures 310 is dependent on the number of slots 304 configured at the bottom portion 306 of the retainer channel 302.

Figure 3B:
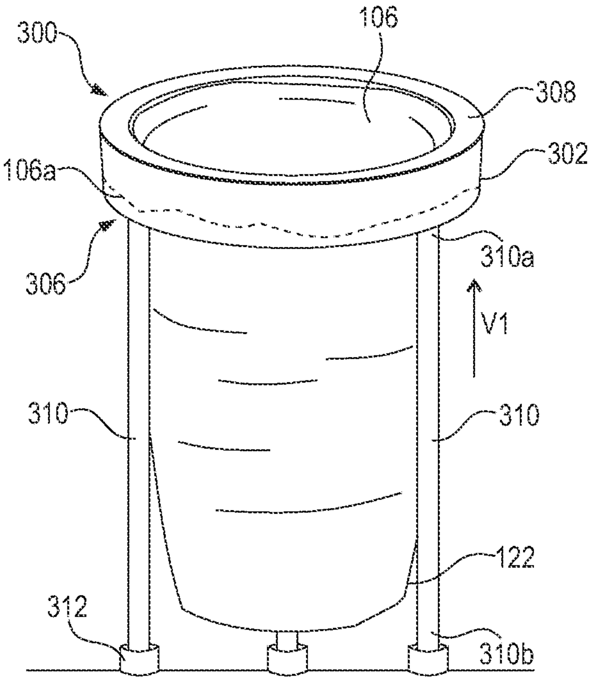
FIG. 3B is a schematic representation of the apparatus of FIG. 3A securing the mouth portion of the trash liner being supported on elongated tubular structures, in accordance with an embodiment of the present disclosure.

Upon securing the elongated tubular structures 310 within the slots 304, the elongated tubular structures 310 are oriented along a vertical direction 'V1' for supporting the retainer channel 302 above the ground (as shown in FIG. 3B). In other words, the apparatus 300 securing the mouth portion 106*a* of the trash liner 106 is raised off a supporting surface (such as a floor) by the elongated tubular structures 310 (as shown in FIG. 3B). Additionally, the elongated tubular structures 310 may include supporting bushes 312 secured to another ends 310*b* of the elongated tubular structures 310. The supporting bush 312 ensures stability when the apparatus 300 supported on the elongated tubular structures 310 is raised off the supporting surface.

Further, the mouth portion 106*a* of the trash liner 106 is secured in the retainer channel 302 by securing the retainer member 308 on top of the retainer channel 302 (as shown in FIG. 3B). As shown in FIG. 3B, the unsecured portion 122 of the trash liner 106 is allowed to flex in a space between the plurality of elongated tubular structures 310 supporting the retainer channel 302. It will be apparent that the retainer channel 302 can also be supported on the floor with only two elongated tubular structures 310 secured to the appropriate slots 304 which allows balancing of the apparatus 300 when the elongated tubular structures 310 are oriented along the vertical direction 'V1'. In an embodiment, the retainer channel 302 mounted with the elongated tubular structures 310 may be secured within a trash receptacle (such as the trash receptacle 108).

Figure 4A:
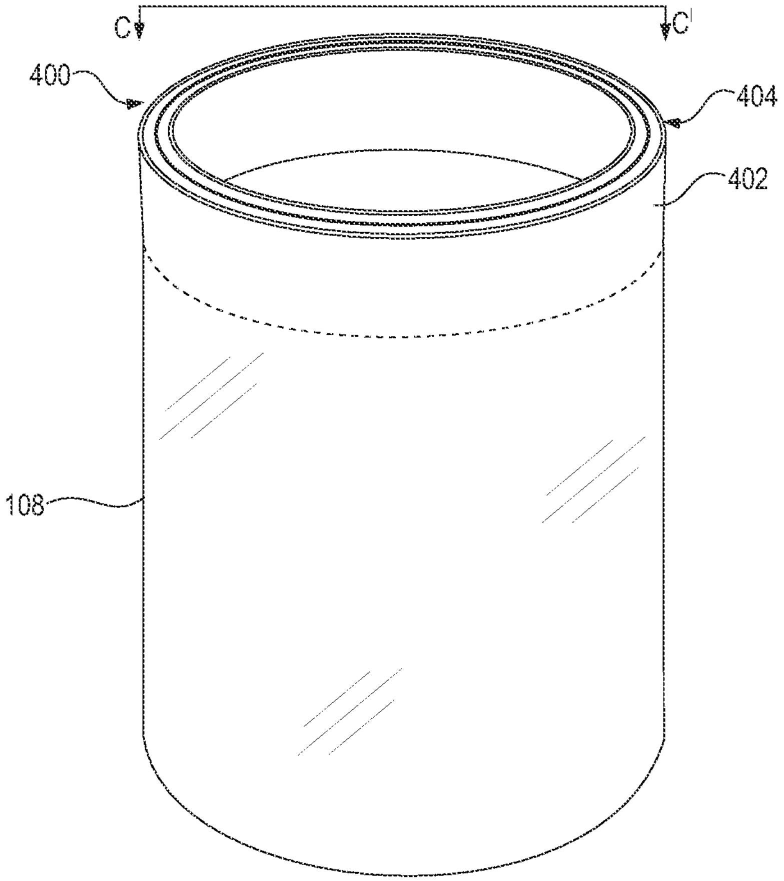
FIG. 4A illustrates a perspective view of an apparatus for securing the mouth portion of the trash liner, in accordance with an embodiment of the present disclosure.

Referring to FIG. 4A, an apparatus 400 includes a retainer channel 402 adapted to be secured within a trash receptacle (such as the trash receptacle 108). The retainer channel 402 secured within the trash receptacle 108 is configured to secure the mouth portion 106*a* of the trash liner 106.

Figure 4B:
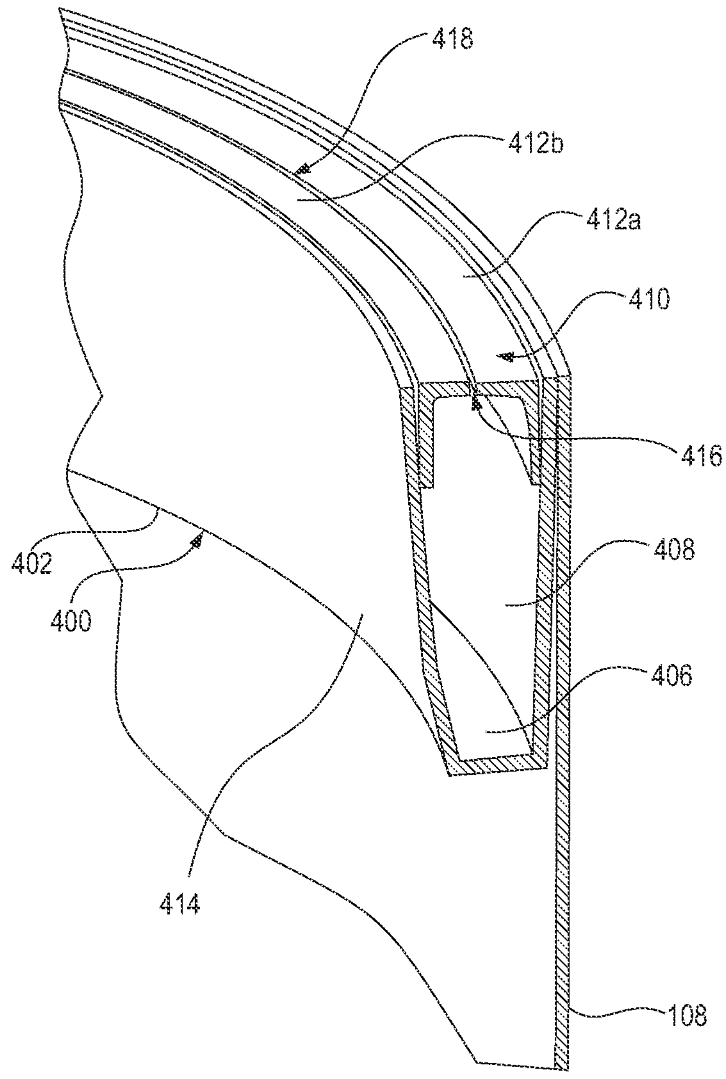
FIG. 4B is a sectional view of a portion of the apparatus of FIG. 4A, depicting a pair of flexible retainer members of the apparatus, in accordance with an embodiment of the present disclosure.

Referring to FIG. 4B, a sectional view of a portion of the retainer channel 402 along a plane C-C' of the apparatus 400 is illustrated, in accordance with an embodiment of the present disclosure. The configuration of the retainer channel 402 is similar to the retainer channel 102 of FIG. 1A. As shown, the retainer channel 402 is configured with a U-shaped structure. It will be apparent that the U-shaped structure of the retainer channel 402 includes a pair of sidewalls 414 and a base surface 406 of the retainer channel 402. The pair of sidewalls 414 includes a first sidewall 411*a* and a second sidewall 411*b*. As such, each of the first sidewall 411*a* and the second sidewall 411*b* extends from opposite sides of the base surface 406 along its length. In an illustrated embodiment, the retainer channel 402 has a solid structure designed at least to sustain a load acted thereupon. The load acted on the retainer channel 402 may be at least the compressive load, the bending load, the shear load, or the combination of the compressive load, the bending load, and the shear load. In another embodiment, other suitable structures such as, but not limited to the hollow structure, the frame structure, the weave structure, the honeycomb structure, or any combination thereof can also be used. Further, the structure of the first sidewall 411*a*, the second sidewall 411*b*, and the base surface 406 of the retainer channel 402 may have the same or different configuration. In one example, the first sidewall 411*a* of the retainer channel 402 may be configured with the solid structure, whereas, the second sidewall 411*b* and the base surface 406 of the retainer channel 402 may be configured with the frame structure that satisfies desired functionality. In another example, the first sidewall 411*a* may be configured with the weave structure, the second sidewall 411*b* may be configured with the solid structure, and the base surface 406 may be configured with the frame structure that satisfies desired functionality.

Additionally, the apparatus 400 includes a pair of flexible retainer members 410. The pair of flexible retainer members 410 includes a first flexible retainer member 412*a* and a second flexible retainer member 412*b*. The first flexible retainer member 412*a* is mounted to the first sidewall 411*a* of the retainer channel 402. Specifically, an outer surface 409 of the first flexible retainer member 412*a* is mounted to an inner surface 408*a* of the first sidewall 411*a* of the retainer channel 402. Likewise, the second flexible retainer member 412*b* is mounted to the second sidewall 411*b* of the retainer channel 402. Specifically, an outer surface 413 of the second flexible retainer member 412*b* is mounted to an inner surface 415 of the second sidewall 411*b* of the retainer channel 402. The first flexible retainer member 412*a* mounted to the first sidewall 411*a* of the retainer channel 402 and the second flexible retainer member 412*b* mounted to the second sidewall 411*b* of the retainer channel 402 such that a portion of the first and second flexible retainer members 412*a*, 412*b* configured for securing the trash liner 106 is oriented parallel to the base surface 406 of the retainer channel 402 (as shown in FIG. 4B). Examples of the flexible materials used in the first and second flexible retainer members 412*a*, and 412*b* may be rubber or flexible plastic, or the like.

Further, the inner surface 408*a* of the first sidewall 411*a*, the inner surface 415 of the second sidewall 411*b*, and the base surface 406 define an interior space 422 for receiving the mouth portion 106*a* of the trash liner 106 therein. A portion of an outer surface 408*b* of the first sidewall 411*a* of the retainer channel 402 is disposed to at least a portion of an interior surface 118 proximate to the aperture 108*b* of the support structure 108.

Furthermore, the retainer channel 402 includes one or more engaging members 417. More specifically, the first sidewall 411*a* of the retainer channel 402 has the one or more engaging members 417 (shown in FIGS. 4C and 4D). The one or more engaging members 417 are adapted to engage a portion 419 of the outer surface 408*b* of the first sidewall 411*a* of the retainer channel 402 with one or more first complementary engaging members 421 of the portion 419 of the interior surface 118 proximate to the aperture 108*b* of the support structure 108. As a result, the one or more engaging members 417 and the one or more first complementary engaging members 421 constrain movement of the first sidewall 411*a* of the retainer channel 402 with respect to the aperture 108*b* of the support structure 108.

Moreover, the first flexible retainer member 412*a* has one or more second complementary engaging members 423. The one or more second complementary engaging members 423 are adapted to be engaged with the one or more engaging members 417 of the first sidewall 411*a* of the retainer channel 402. As a result, the one or more engaging members 417 and the one or more second complementary engaging members 423 constrain movement of the first flexible retainer member 412*a* with respect to the first sidewall 411*a* of the retainer channel 402.

Figure 4C:
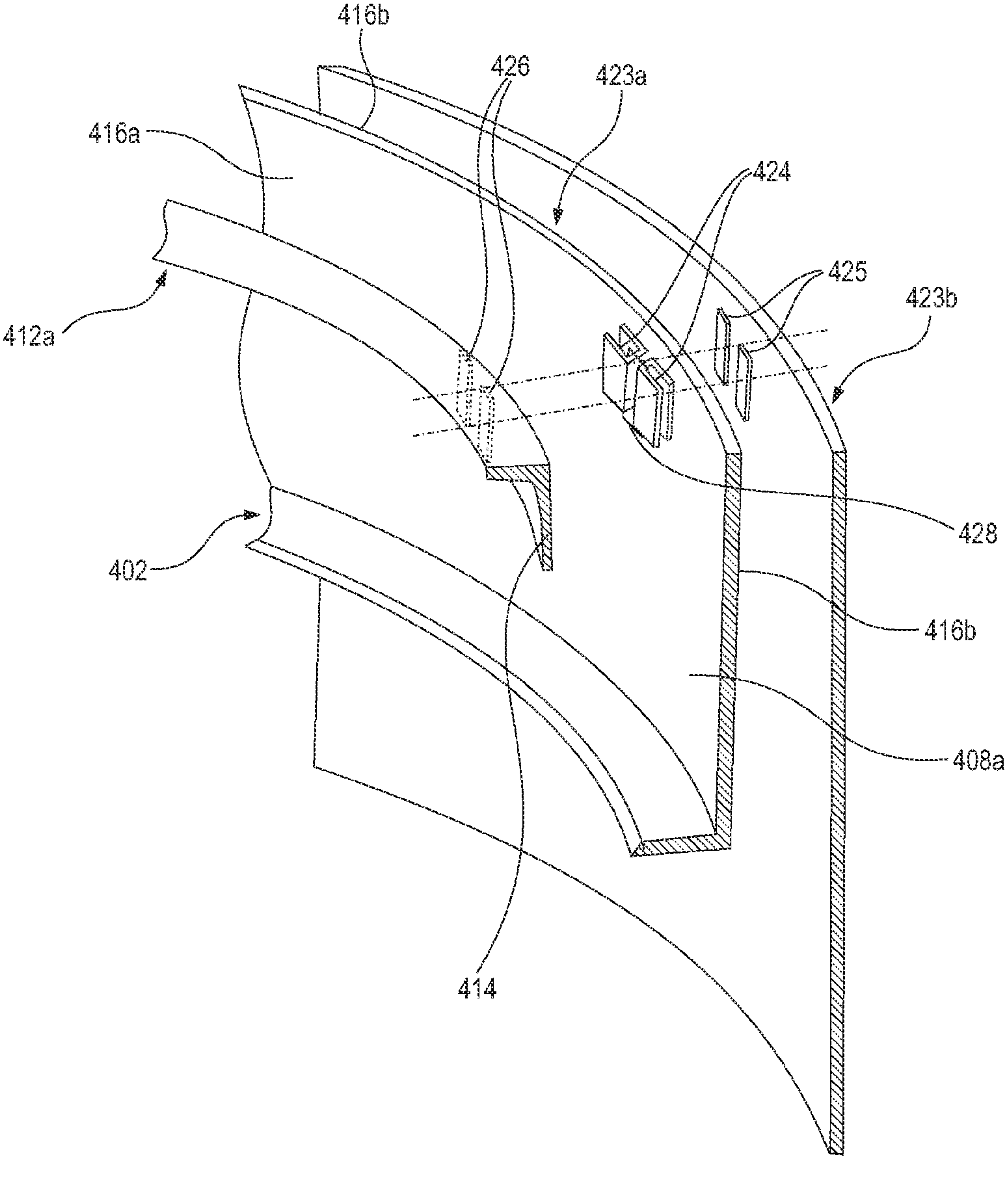
FIG. 4C illustrates an exploded view of an assembly of a first sidewall of a retainer channel with a first flexible retainer member and a support structure of FIG. 4B, in accordance with one embodiment of the present disclosure.

In one embodiment, the one or more engaging members 417, the one or more first complementary engaging members 421, and the one or more second complementary engaging members 423 may be adhesive tapes. More specifically, the one or more engaging members 417 are a first set of adhesive tapes, the one or more first complementary engaging members 421 are a second set of adhesive tapes, and the one or more second complementary engaging members 423 are a third set of adhesive tapes. As shown in FIG. 4C, a slot 425 is formed on the first sidewall 411*a* of the retainer channel 402 to secure the first set of adhesive tapes to both the inner surface 408*a* and the outer surface 408*b* of the first sidewall 411*a*. In the illustrated embodiment, the slot 425 has a rectangular shape configured to be bounded the first set of adhesive tapes to both the inner surface 408*a* and the outer surface 408*b* of the first sidewall 411*a*. However, in another embodiment, the slot 425 may be configured with other shapes such as circular, square, hexagonal, etc. Corresponding to the first set of adhesive tapes, the second set of adhesive tapes is bounded to the portion of the interior surface 118 proximate to the aperture 108*b* of the support structure 108, and the third set of adhesive tapes is bounded to the outer surface 409 of the first flexible retainer member 412*a*. The first set of adhesive tapes, the second set of adhesive tapes, and the third set of adhesive tapes used herein are both-sided adhesive tapes designed to adhesively engage the retainer channel 402 with the first flexible retainer member 412*a* and the aperture 108*b* of the support structure 108. Each of the first set of adhesive tapes, the second set of adhesive tapes, and the third set of adhesive tapes may be made up of suitable material such as paper, rubber, plastic film, cloth, metal foil, etc., and suitable adhesive may be coated on both the sides.

Figure 4D:
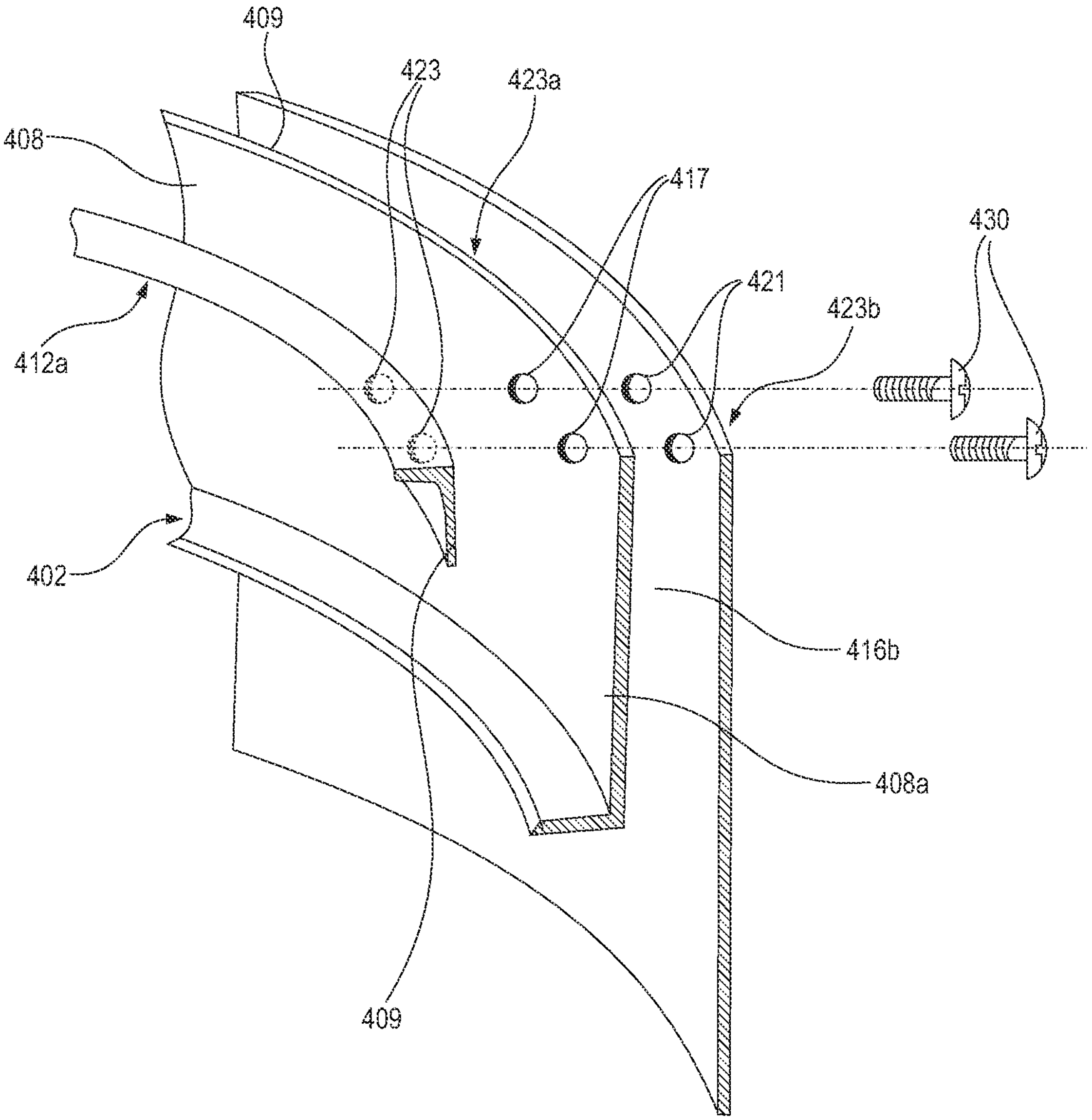
FIG. 4D illustrates an exploded view of the assembly of the first sidewall of the retainer channel with the first flexible retainer member and the support structure of FIG. 4B, in accordance with another embodiment of the present disclosure.

In another embodiment, the one or more engaging members 417 of the first sidewall 411*a* of the retainer channel 402, the one or more first complementary engaging members 421 of the portion of the interior surface 118 proximate to the aperture 108*b* of the support structure 108, and the one or more complementary engaging members 427 of the first flexible retainer member 412*a* may be fastener receiving members (as shown in FIG. 4D). The fastener receiving members are adapted to receive fasteners 428, thereby engaging the first sidewall 411*a* of the retainer channel 402 with the portion of the interior surface 118 proximate to the aperture 108*b* of the support structure 108 and the first flexible retainer member 412*a* of the pair of flexible retainer member 410. In the illustrated embodiment, the fasteners 428 are screws and the fastener receiving members are holes. The holes may be provided with a thread profile complementary to the thread profile of the screws to hold and tighten screws securely. It should be noted that the fasteners used herein are not limited to the screws, the other type of fasteners such as but not limited to, nuts and bolts, clips, rivets, studs, eye bolts, and the like, can also be used.

Figure 4E:
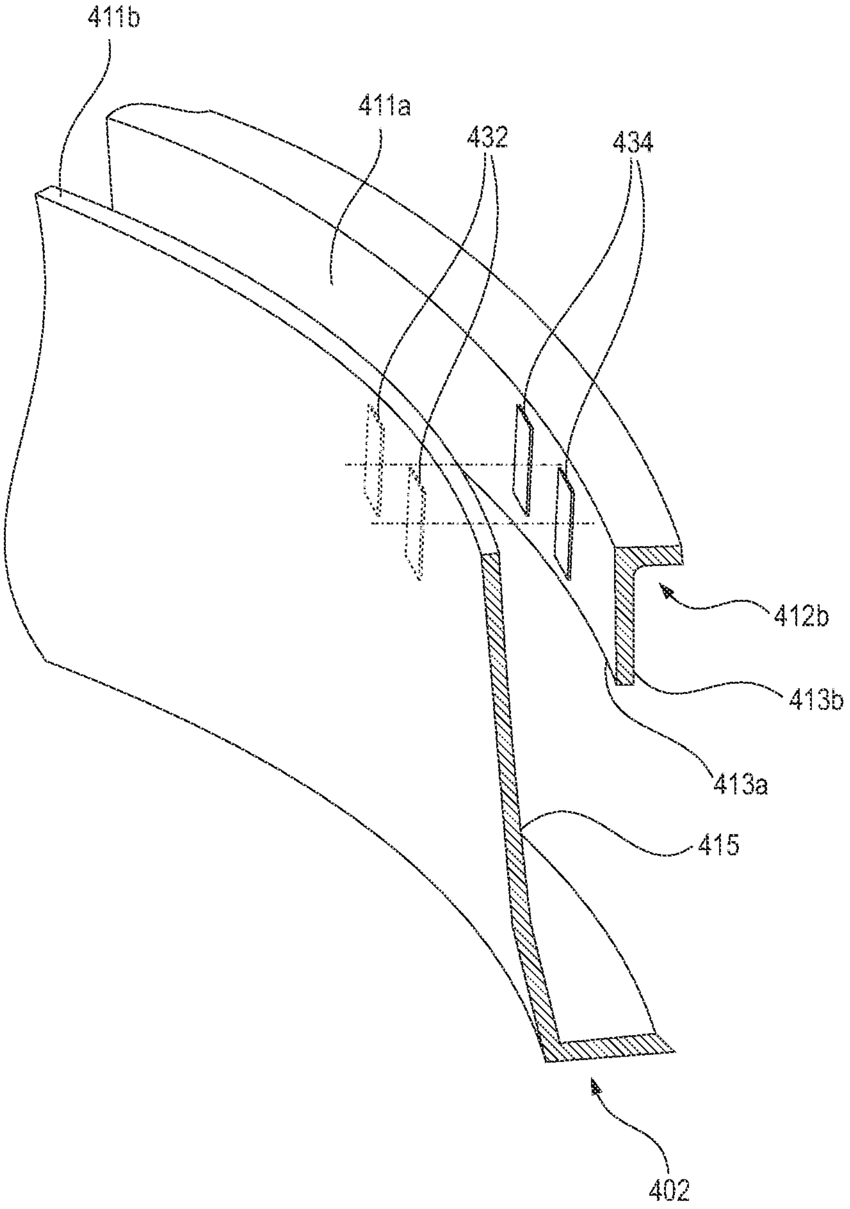
FIG. 4E illustrates an exploded view of an assembly of a second sidewall of the retainer channel with a second flexible retainer member FIG. 4B, in accordance with one embodiment of the present disclosure.

Referring to FIG. 4E, the retainer channel 402 includes a plurality of second engaging members 430. Specifically, the second sidewall 411*b* of the retainer channel 402 has the plurality of second engaging members 430 adapted to be engaged with a plurality of second complementary engaging members 432 of the second flexible retainer member 412*b*. As a result, the plurality of second engaging members 430 and the plurality of second complementary engaging members 432 constrain movement of the second flexible retainer member 412*b* with respect to the second sidewall 411*b* of the retainer channel 402.

In one embodiment, the plurality of second engaging members 430 and the plurality of second complementary engaging members 432 are adhesive tapes. As shown in FIG. 4E, the plurality of second engaging members 430 are a fourth set of adhesive tapes bound to the inner surface 415 of the second sidewall 411*b* of the retainer channel 402. Correspondingly, the plurality of second complementary engaging members 432 are a fifth set of adhesive tapes bound to the outer surface 413 of the second flexible retainer member 412*b*. The fourth set of adhesive tapes and the fifth set of adhesive tapes used herein are both-sided adhesive tapes designed to adhesively engage the second sidewall 411*b* of the retainer channel 402 with the second flexible retainer member 412*b* of the pair of flexible retainer members 410. Each of the fourth set of adhesive tapes and the fifth set of adhesive tapes may be made up of suitable material such as paper, rubber, plastic film, cloth, metal foil, etc., and suitable adhesive may be coated on both sides.

Figure 4F:
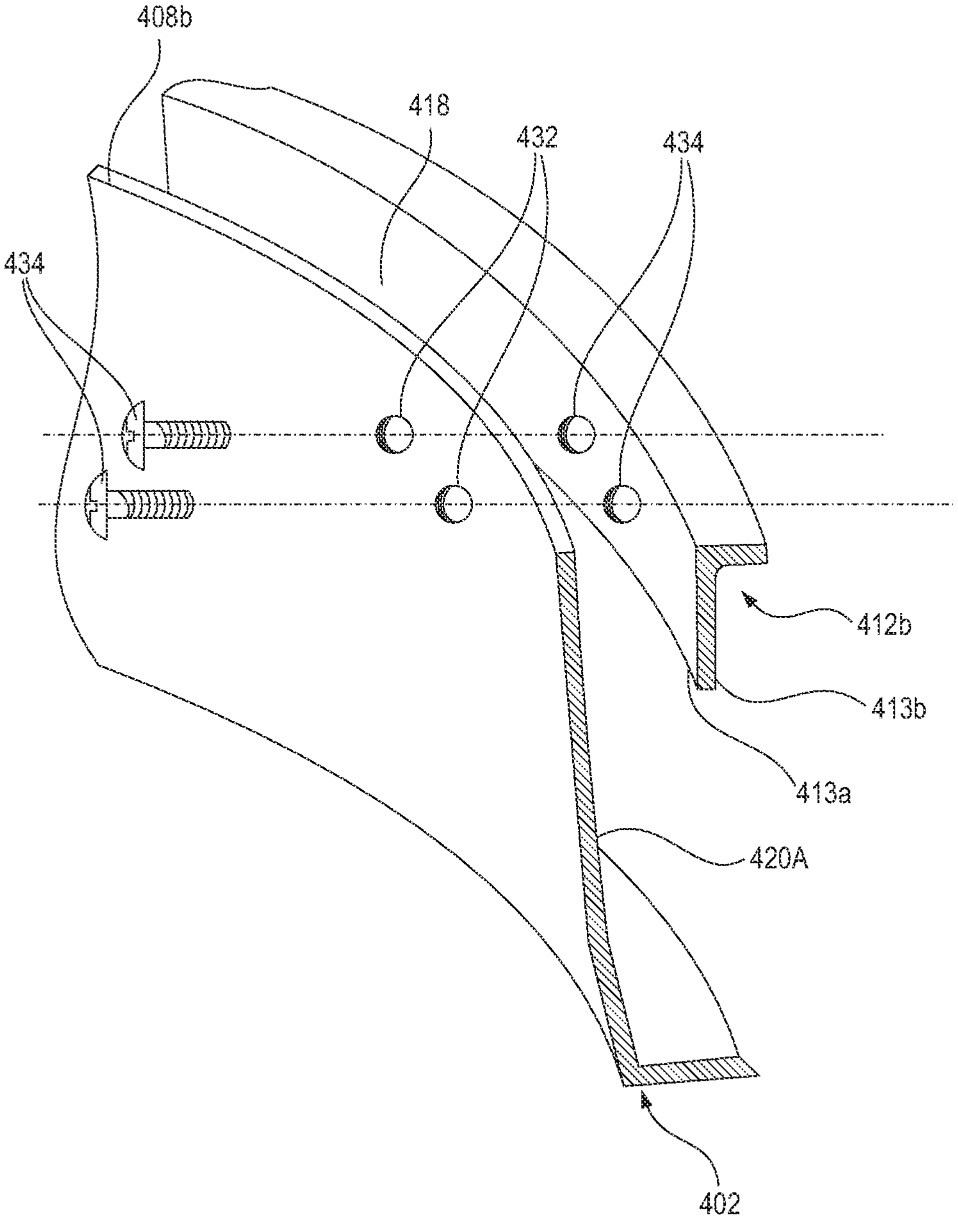
FIG. 4F illustrates an exploded view of the assembly of the second sidewall of the retainer channel with the second flexible retainer member FIG. 4B, in accordance with one embodiment of the present disclosure.

In another embodiment, the plurality of second engaging members 430 of the second sidewall 411*b* of the retainer channel 402 and the plurality of second complementary engaging members 432 of the second flexible retainer member 412*b* are fastener receiving members adapted to receive fasteners 434 (as shown in FIG. 4F). The fastener receiving members are adapted to receive fasteners 436, thereby engaging the second sidewall 411*b* of the retainer channel 402 with the second flexible retainer member 412*b* of the pair of flexible retainer members 410. In the illustrated embodiment, the fasteners 434 are screws and the fastener receiving members are holes. The holes may be provided with a thread profile complementary to the thread profile of the screws to hold and tighten screws securely. It should be noted that the fasteners used herein are not limited to the screws, the other type of fasteners such as, but not limited to, nut and bolt, clips, rivets, studs, eye bolts, and the like, can also be used for engaging the second sidewall 411*b* of the retainer channel 402 with the second flexible retainer member 412*b*.

Further, referring now to FIG. 4B, a free end 416 of the first and second flexible retainer members 412*a*, and 412*b* is facing toward each other and located in close proximity and defines a gap 418, i.e. a narrow channel therebetween (see FIG. 4B). The first flexible retainer member 412*a* mounted to the inner surface 408*a* of the first sidewall 411*a* and the second flexible retainer members 412*b* mounted to the inner surface 415 of the second sidewall 411*b* are oriented parallel to the base surface 406 and are positioned at the same height in the retainer channel 402. In an embodiment, the first flexible retainer member 412*a* may be positioned at a height slightly less than the height of the second flexible retainer member 412*b* or vice-versa.

Figure 4G:
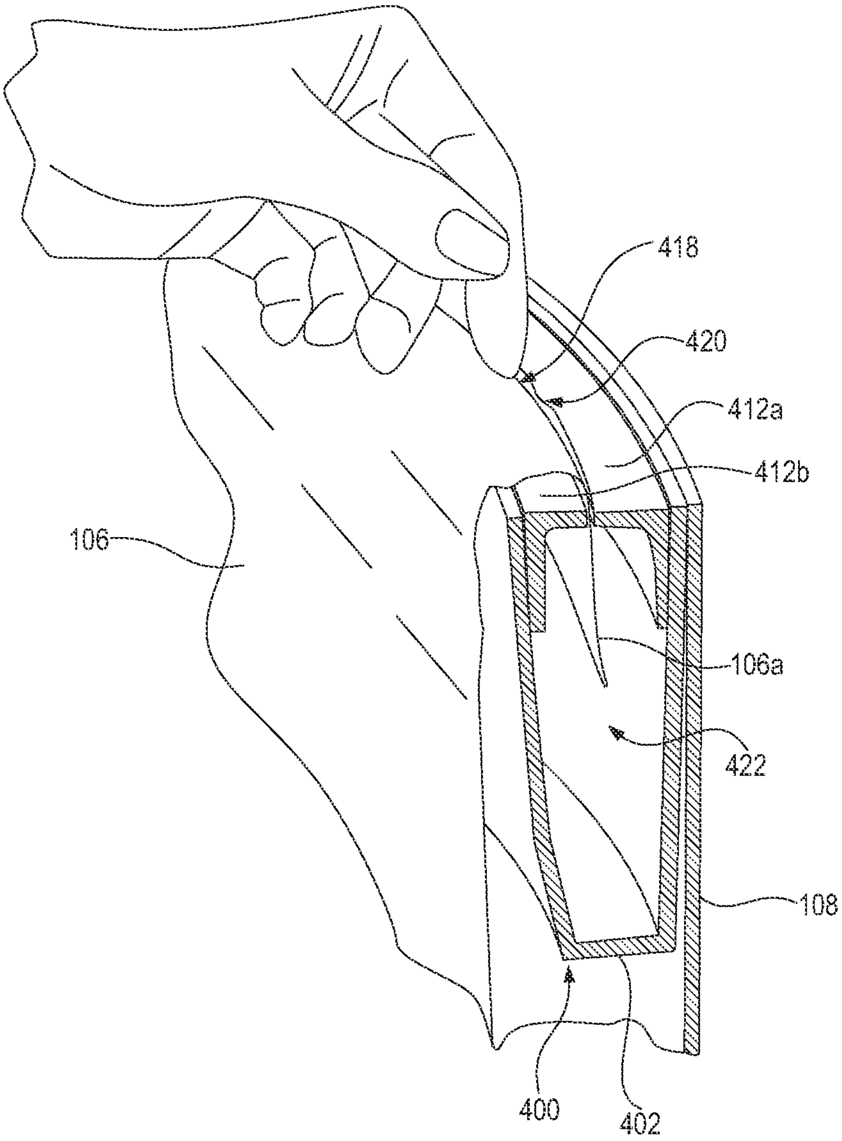
FIGS. 4G and 4H illustrate a stepwise articulation of the pair of flexible retainer members for retaining the mouth portion of the trash liner within a retainer channel of the apparatus, in accordance with an embodiment of the present disclosure.
Figure 4H:
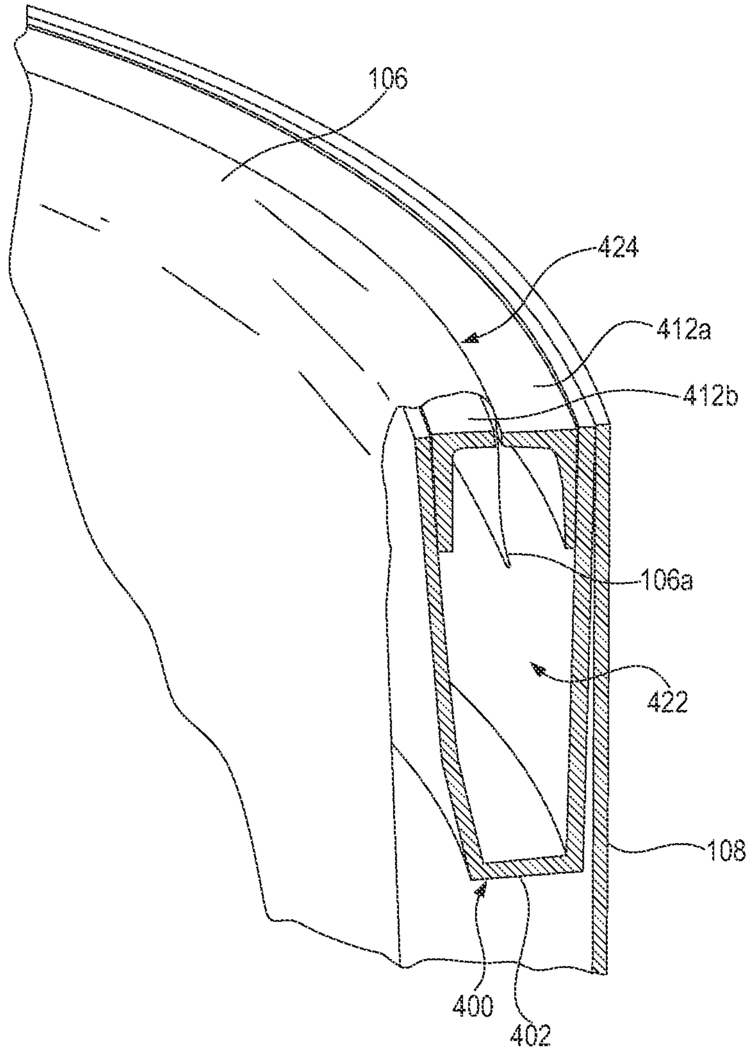

In use, at least one of the first and second flexible retainer members 412*a*, and 412*b* is operated in a collapsed form (see, 420 of FIG. 4G). For illustration purposes, a user's hand operating at least one of the first and second flexible retainer members 412*a*, and 412*b* is shown in FIG. 4G. Moreover, operating either of the first and second flexible retainer members 412*a*, and 412*b* in the collapsed form 420 alters the gap 418, thereby allowing insertion of the mouth portion 106*a* of the trash liner 106 within the interior space 422 of the retainer channel 402 (as shown in FIG. 4G). In other words, operating at least one of the first and second flexible retainer members 412*a*, and 412*b* in the collapsed form 420 widens the gap 418, thus allowing the user to insert the mouth portion 106*a* of the trash liner 106 within the interior space 422 defined in the retainer channel 402 (as shown in FIG. 4G). Thereafter, the user may release the pressure on the first and second flexible retainer members 412*a*, and 412*b* for securing the mouth portion 106*a* of the trash liner 106 in the interior space 422 of the retainer channel 402 (as shown in FIG. 4H). More specifically, the first and second flexible retainer members 412*a*, and 412*b* attain a retracted form 424 from the collapsed form 420 upon releasing the pressure from the first and second flexible retainer members 412*a*, and 412*b* (as shown in FIG. 4H). The first and second flexible retainer members 412*a*, and 412*b* operated in the retracted form 424 from the collapsed form 420 and retains the mouth portion 106*a* of the trash liner 106 in the interior space 422 of the retainer channel 402 (as shown in FIG. 4H). This configuration of the apparatus 400 eliminates the usage of the retainer member as explained with references to FIGS. 1A-3B for securing the trash liner 106.

Figure 4I:
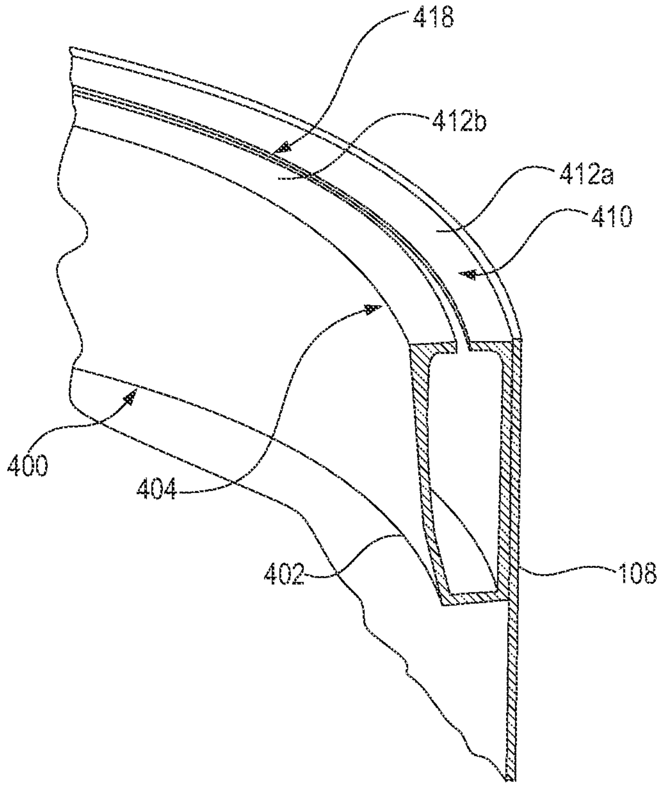
FIG. 4I illustrates a sectional view of a portion of the apparatus of FIG. 4A for retaining the mouth portion of the trash liner, in accordance with another embodiment of the present disclosure.

In an embodiment, the first and second flexible retainer members 412*a*, and 412*b* may be the integral components of the retainer channel 402 (as shown in FIG. 4I). In other words, the U-shaped structure of the retainer channel 402 may be configured with the first and second flexible retainer members 412*a*, and 412*b* at a top portion 404 of the retainer channel 402. This configuration of the retainer channel 402 corresponds to a partially closed channel at the top portion 404 while maintaining a narrow opening (i.e., the gap 418) therebetween (as shown in FIG. 4I). The retainer channel 402 may be integrally configured with the first and second flexible retainer members 412*a*, and 412*b* using casting and molding techniques.

Figure 4J:
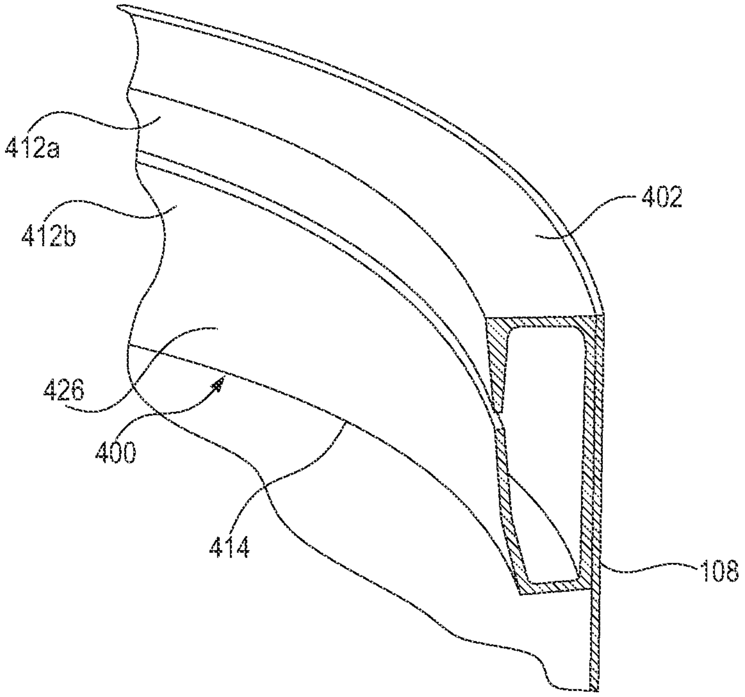
FIG. 4J illustrates a sectional view of a portion of the apparatus of FIG. 4A for retaining the mouth portion of the trash liner, in accordance with another embodiment of the present disclosure.

In another embodiment, the first and second flexible retainer members 412*a*, and 412*b* are configured along a length of the inner surface 408*a* of the first sidewall 411*a* oriented towards the interior of the support structure 108 (as shown in FIG. 4J). It is to be noted that the pair of flexible retainer members 410 configured on the inner surface 408*a* of the first sidewall 411*a* is perpendicular to the longitudinal axis A-A' of the trash receptacle 108.

Further, the pair of flexible retainer members 410 has the solid structure designed to be removably secured to the retainer channel 402 for retaining the mouth portion 106*a* within the interior space 422 (shown in FIG. 4B). However, in another embodiment, other suitable structures such as, but not limited to the hollow structure, the frame structure, the weave structure, the honeycomb structure, or any combination thereof can also be used, without limiting the scope of the invention.

Figure 5A:
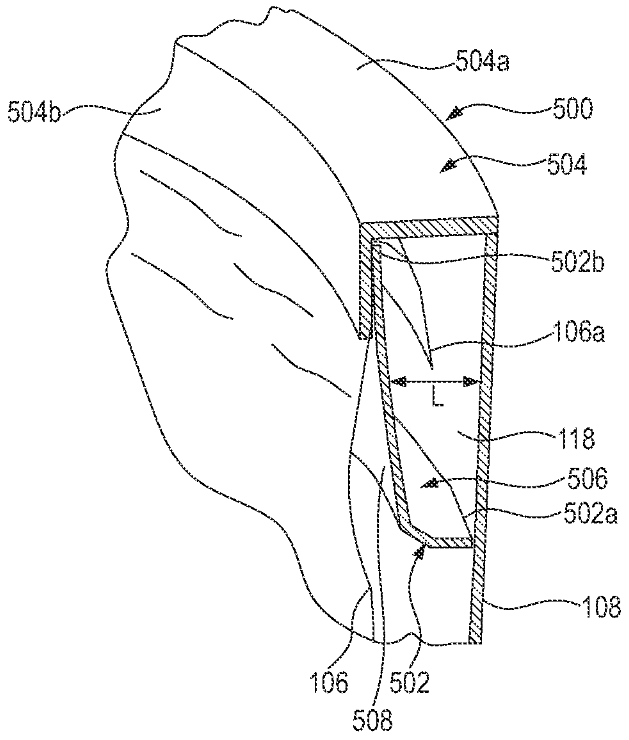
FIGS. 5A and 5B illustrate a sectional view of an apparatus for securing the mouth portion of the trash liner, in accordance with an embodiment of the present disclosure.

FIG. 5A illustrates a sectional view of a portion of an apparatus 500 for securing the mouth portion 106*a* of the trash liner 106, in accordance with another embodiment of the present disclosure. The apparatus 500 includes a retainer channel 502 and a retainer member 504. As shown, the retainer channel 502 is configured with a J-shaped configuration or an L-shaped configuration. The retainer channel 502 may be made of materials similar to the materials of the retainer channel 102 of FIG. 1A.

The retainer channel 502 includes a first end 502*a* and a second end 502*b*. In an embodiment, the first end 502*a* may be detachably mounted to the interior surface 118 of the trash receptacle 108 such that the second end 502*b* is positioned at the same height as the top end of the trash receptacle 108. Further, at least the portion of the interior surface 118 proximate to the aperture and the retainer channel 502 (J-shaped configuration) forms a passageway 506 therebetween. The passageway 506 is configured for receiving the mouth portion 106*a* of the trash liner 106 therein. In another embodiment, the first end 502*a* of the retainer channel 502 may be secured to the trash receptacle 108 using conventional means such as casting and molding techniques.

The retainer member 504 includes a first portion 504*a* and a second portion 504*b*. The first portion 504*a* may be configured based on the dimensions of a length (represented by 'L') of the passageway 506 in a horizontal direction, thereby ensuring a snug fit of the retainer member 504 to the retainer channel 502. Further, the second portion 504*b* corresponds to a flange member. As shown, the retainer member 504 is configured to include one flange member, and further, the retainer member 504 may include more than one flange member (e.g., two flange members as shown in FIG. 1A) therefore, it should not be taken to limit the scope of the present disclosure. In use, the mouth portion 106*a* of the trash liner 106 is secured within the passageway 506. Thereafter, the retainer member 504 is secured to the retainer channel 502 by abutting the second portion 504*b* to at least a portion of the trash liner 106 overlapping on a portion of an outer surface 508 of the retainer channel 502 (as shown in FIG. 5A).

Figure 5B:
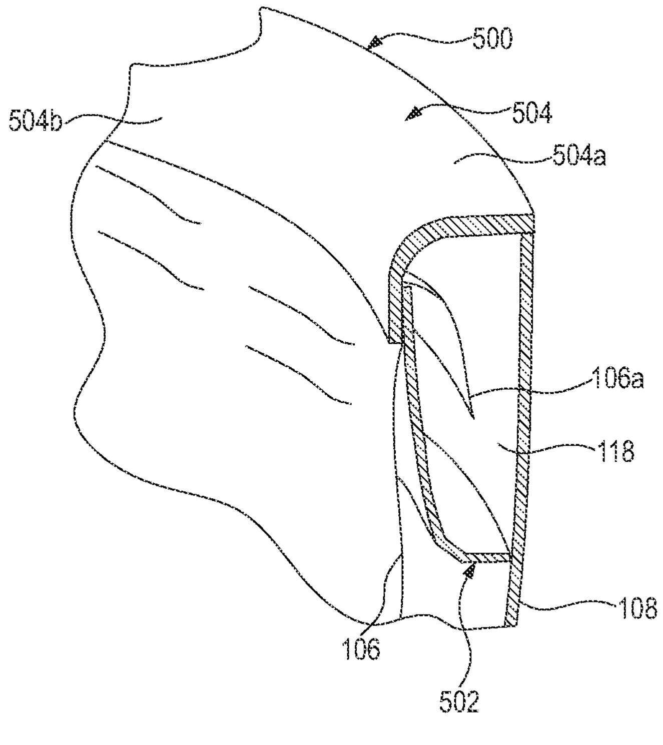

In an embodiment, the retainer member 504 may be configured with a curved profile (as shown in FIG. 5B). Specifically, the first portion 504*a* and the second portion 504*b* may be integrally formed with a curved profile based on the dimensions of the length 1' of the passageway 506, thus ensuring a snug fit of the retainer member 504 to the retainer channel 502 (as shown in FIG. 5B). Further, the operability of the retainer member 504 configured with the curved profile (as shown in FIG. 5B) is similar to the operability of the retainer member 504 configured with vertical and horizontal planes, and a corner (as shown in FIG. 5A).

Figure 6A:
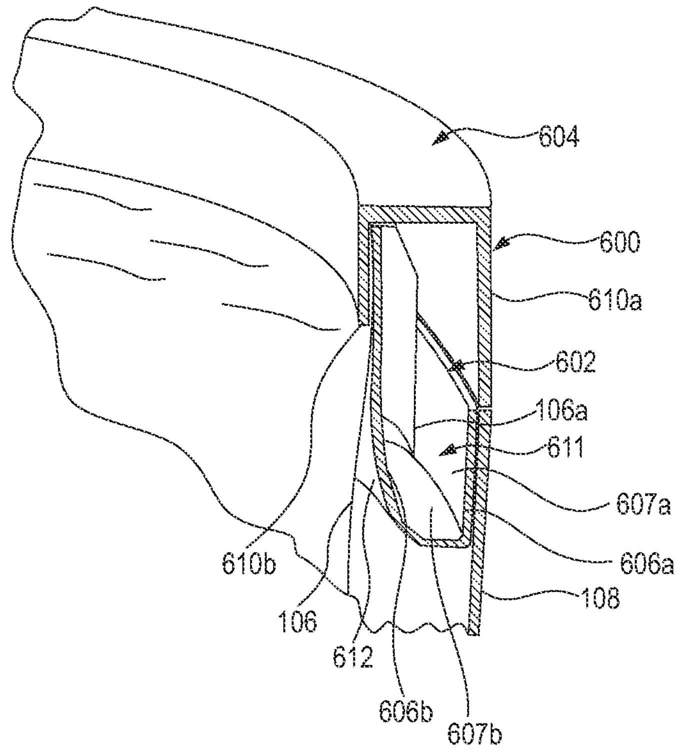
FIG. 6A illustrates a sectional view of an apparatus for securing the mouth portion of the trash liner, in accordance with an embodiment of the present disclosure.

FIG. 6A illustrates a sectional view of a portion of an apparatus 600 for securing the mouth portion 106*a* of the trash liner 106, in accordance with another embodiment of the present disclosure. The apparatus 600 includes a retainer channel 602 and a retainer member 604.

The retainer channel 602 is configured with a U-shaped configuration. The U-shaped configuration of the retainer channel 602 includes a pair of sidewalls (i.e. a first sidewall 606*a* and a second sidewall 606*b*). The first sidewall 606*a* and the second sidewall 606*b* are configured with unequal length dimensions. As shown, the length dimension of the first sidewall 606*a* is relatively lesser than the length dimension of the second sidewall 606*b*. In other words, the first sidewall 606*a* and the second sidewall 606*b* are configured with unequal length dimensions. An inner surface 607*a* of the first sidewall 606*a* and an inner surface 607*b* of the second sidewall 606*b* define an interior space 611. The interior space 611 is adapted to receive the mouth portion 106*a* of the trash liner 106 therein. Further, the first sidewall 606*a* of the retainer channel 602 is disposed to the interior surface 118 proximate to the aperture of the trash receptacle 108 such that the top end of the first sidewall 606*a* and the trash receptacle 108 is maintained at the same height and the second sidewall 606*b* exceeds the length of the trash receptacle 108.

In an illustrated embodiment, the retainer channel 602 has a solid structure designed at least to sustain a load acted thereupon. The load acted on the retainer channel 602 may be at least the compressive load, the bending load, the shear load, or the combination of the compressive load, the bending load, and the shear load. In another embodiment, other suitable structures such as, but not limited to the hollow structure, the frame structure, the weave structure, the honeycomb structure, or any combination thereof can also be used. Further, the structure of the first sidewall 606*a* and the second sidewall 606*b* of the retainer channel 602 may have the same or different configuration. In one example, the first sidewall 606*a* of the retainer channel 602 may be configured with the solid structure, whereas, the second sidewall 606*b* of the retainer channel 602 may be configured with the frame structure that satisfies desired functionality. In another example, the first sidewall 606*a* may be configured with the weave structure, whereas, the second sidewall 606*b* may be configured with the frame structure that satisfies desired functionality.

Figure 6B:
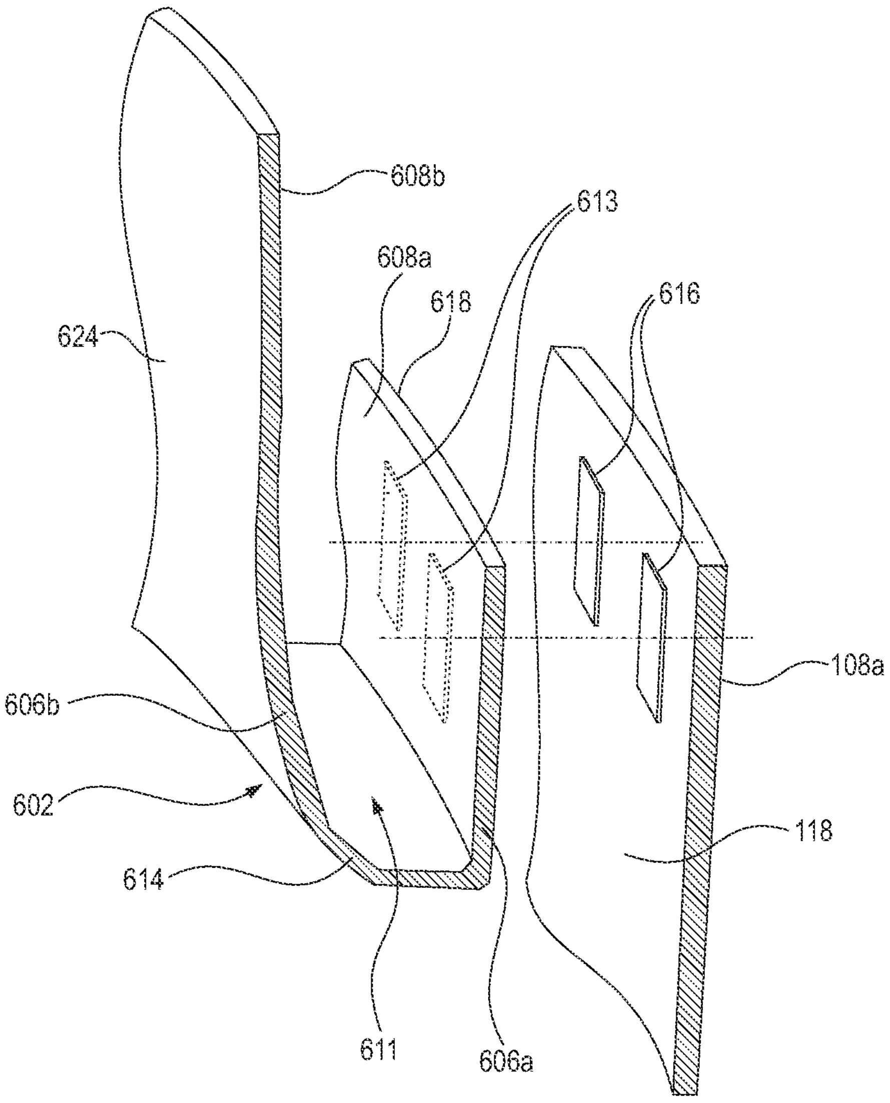
FIG. 6B illustrates an exploded view of an assembly of a retainer channel with a support structure of FIG. 6A, in accordance with one embodiment of the present disclosure.
Figure 6C:
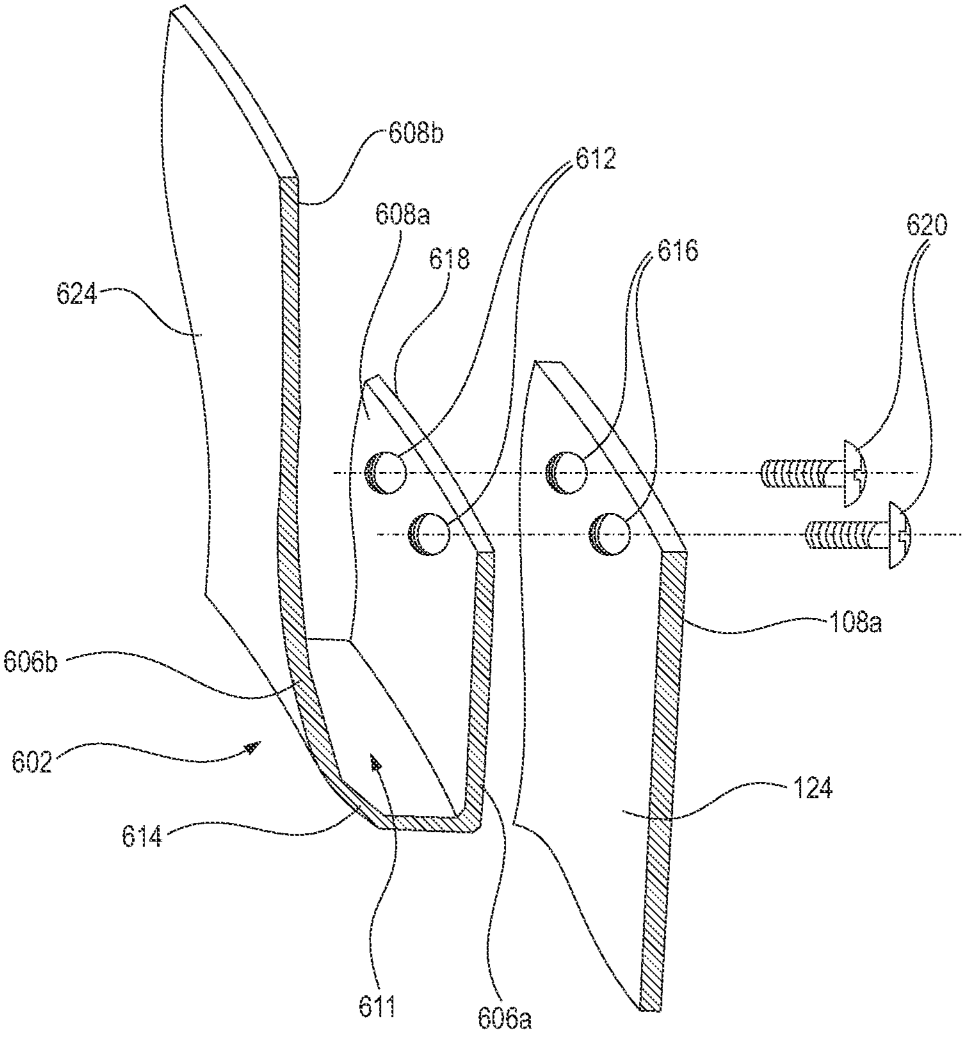
FIG. 6C illustrates an exploded view of the assembly of the retainer channel with the support structure of FIG. 6A, in accordance with another embodiment of the present disclosure.

Furthermore, the retainer channel 602 has one or more engaging members 613 (shown in FIGS. 6B and 6C). The one or more engaging members 613 are adapted to engage a portion of an outer surface 614 of the retainer channel 602 with one or more complementary engaging members 616 of the portion of the interior surface 118 proximate to the aperture 108*b* of the support structure 108. Specifically, the one or more engaging members 613 and the one or more complementary engaging members 616 engage an outer surface 618 of the first sidewall 606*a* of the retainer channel 602 with the portion of the interior surface 118 proximate to the aperture 108*b* of the support structure 108. As a result, the one or more engaging members 613 and the one or more complementary engaging members 616 constrain movement of the retainer channel 602 with respect to the aperture 108*b* of the support structure 108.

In one embodiment, any of the one or more engaging members 613 and the one or more complementary engaging members 616 may be adhesive tapes. As shown in FIG. 6B, the one or more engaging members 613 are a first set of adhesive tapes bound to the outer surface 618 of the first sidewall 606*a* of the retainer channel 602. Correspondingly, the one or more complementary engaging members 616 are a second set of adhesive tapes bound to the interior surface 118 proximate to the aperture 108*b* of the support structure 108. The first set of adhesive tapes and the second set of adhesive tapes used herein are both-sided adhesive tapes designed to adhesively engage the retainer channel 602 with the aperture 108*b* of the support structure 108. Each of the first set of adhesive tapes and the second set of adhesive tapes may be made up of suitable material such as paper, rubber, plastic film, cloth, metal foil, etc., and may be coated with suitable adhesive on both sides.

In another embodiment, the one or more engaging members 613 of the retainer channel 602 and the one or more complementary engaging members 616 of the portion of the interior surface 118 proximate to the aperture of the support structure 108 may be fastener receiving members (as shown in FIG. 6C). The fastener receiving members are adapted to receive fasteners 620, thereby engaging the retainer channel 602 with the aperture 108*b* of the support structure 108. In the illustrated embodiment, the fasteners 620 are screws and the fastener receiving members are holes. The holes may be provided with a thread profile complementary to the thread profile of the screws to hold and tighten screws securely. It should be noted that the fasteners used herein are not limited to the screws, the other type of fasteners such as, but not limited to, nut and bolt, clips, rivets, studs, eye bolts, and the like, can also be used for engaging the retainer channel 602 with the aperture 108*b* of the support structure 108. In yet another embodiment, the retainer channel 602 may be an integral part of the support structure 108. The retainer channel 602 and the support structure 108 may be formed as a unitary structure during fabrication of the apparatus 600.

Referring now to FIG. 6A, the retainer member 604 may be configured based on the dimensions of the retainer channel 602. The retainer member 604 is configured with an inverted U-shaped structure. Particularly, the retainer member 604 includes one or more flange members (collectively referred for a first flange member 610*a* and a second flange member 610*b*). As shown, the length dimension of the second flange member 610*b* is greater than the length dimension of the first flange member 610*a*. In other words, the first flange member 610*a* and the second flange member 610*b* are configured with unequal length dimensions. It is to be noted that the length dimension of the first flange member 610*a* is configured based on the length dimension of the portion of the first sidewall 606*a* exceeding the length of the trash receptacle 108. In use, the mouth portion 106*a* of the trash liner 106 is secured within the retainer channel 602. Thereafter, the retainer member 604 is secured to the retainer channel 602 such that the second flange member 610*b* abuts at least a portion of the trash liner 106 overlapping on a portion of an outer surface 612 of the second sidewall 606*b* of the retainer channel 602 (see FIG. 6A. In an embodiment, the lower end of the first flange member 610*a* may include securing means such as, but not limited to, adhesive or any other securing means for securing onto the top end of the trash receptacle 108.

Various embodiments of the disclosure, as discussed above, may be practiced with steps and/or operations in a different order, and/or with hardware elements in configurations, which are different than those which are disclosed. Therefore, although the disclosure has been described based on these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for securing a trash liner, the apparatus comprising:

a retainer channel comprising an inner surface and an outer surface, a portion of the outer surface disposed to at least a portion of an interior surface proximate to an aperture of a support structure, and the inner surface defining an interior space within the retainer channel for receiving a mouth portion of the trash liner therein, the retainer channel further comprising one or more engaging members adapted to engage the portion of the outer surface of the retainer channel with one or more first complementary engaging members disposed to the portion of the interior surface, thereby constraining movement of the retainer channel with respect to the aperture of the support structure; and a retainer member comprising one or more flange members, each flange member of the one or more flange members extending downwardly from a bottom portion of the retainer member and oriented along a longitudinal axis of the support structure, wherein a flange member of the one or more flange members of the retainer member is configured to be removably secured to a portion of the inner surface of the retainer channel for retaining the mouth portion of the trash liner there between, while an unsecured portion of the trash liner is disposed within the support structure, wherein the flange member comprises one or more second complementary engaging members adapted to be engaged with the one or more engaging members of the retainer channel, thereby constraining a movement of the retainer member with respect to the retainer channel.

2. The apparatus as claimed in claim 1, wherein the one or more engaging members, the one or more first complementary engaging members, and the one or more second complementary engaging members are adhesive tapes adapted to adhesively engage the retainer channel with the retainer member and the aperture of the support structure.

3. The apparatus as claimed in claim 1, wherein the one or more engaging members, the one or more first complementary engaging members, and the one or more second complementary engaging members are fastener receiving members adapted to receive fasteners, thereby fastening the retainer channel with the retainer member and the aperture of the support structure.

4. The apparatus as claimed in claim 1, wherein the one or more flange members of the retainer member about the inner surface of the retainer channel for removably securing the retainer member to a top portion of the retainer channel.

5. The apparatus as claimed in claim 1, further comprises:

a pair of flexible retainer members including a first flexible retainer member and a second flexible retainer member, the first and second flexible retainer members mounted to the inner surface of each sidewall of the retainer channel such that a portion of the first and second flexible retainer members is oriented parallel to a base surface of the retainer channel, wherein a free end of the first and second flexible retainer members is facing toward each other and positioned in close proximity, thus defining a gap there between.

6. The apparatus as claimed in claim 5, wherein at least one of the first flexible retainer member and the second flexible retainer member is operated in a collapsed form to alter the gap defined by the first and second flexible retainer members, thereby allowing insertion of the mouth portion of the trash liner within the interior space of the retainer channel.

7. The apparatus as claimed in claim 6, wherein the mouth portion is secured in the interior space of the retainer channel when at least one of the first and second flexible retainer members attain a retracted form from the collapsed form.

8. The apparatus as claimed in claim 1, wherein the support structure is a trash receptacle.

9. The apparatus as claimed in claim 1, wherein the retainer member includes a lid fitted to one end of a top portion of the retainer member, and wherein the lid is operable between an open position and closed position for covering an aperture of the trash receptacle.

10. The apparatus as claimed in claim 1, wherein the support structure comprises a plurality of elongated tubular structures, and wherein the retainer channel is supported on the plurality of elongated tubular structures such that the unsecured portion of the trash liner is allowed to flex in a space between the plurality of elongated tubular structures supporting the retainer channel.

11. The apparatus as claimed in claim 1, wherein the retainer channel, the retainer member, and the support structure are configured in a shape comprising at least one of:

oval, square, hexagon, rectangular, rectangular with rounded corners, and pentagon.

12. An apparatus for securing a mouth portion of a trash liner, the apparatus comprising:

a retainer channel comprising an inner surface and an outer surface, a portion of the outer surface disposed to at least a portion of an interior surface proximate to an aperture of a support structure, and the inner surface defining an interior space within the retainer channel for receiving a mouth portion of the trash liner therein, the retainer channel further comprising one or more engaging members adapted to engage the portion of the outer surface of the retainer channel with one or more first complementary engaging members disposed to the portion of the interior surface, thereby constraining movement of the retainer channel with respect to the aperture of the support structure; and a pair of flexible retainer members comprising a first flexible retainer member and a second flexible retainer member, the first flexible retainer member mounted to a first sidewall of a pair of sidewalls of the retainer channel and the second flexible retainer member mounted to a second sidewall of the pair of sidewalls such that a portion of the first and second flexible retainer members is oriented parallel to a base surface of the retainer channel, wherein the first flexible retainer member comprises one or more second complementary engaging members adapted to be engaged with the one or more engaging members of the retainer channel, thereby constraining movement of the first flexible retainer member with respect to the retainer channel, wherein a free end of the first and second flexible retainer members is facing toward each other and positioned in close proximity, thus defining a gap there between, and wherein the first and second flexible retainer members are operated between a collapsed form and a retracted form for retaining the mouth portion of the trash liner within the interior space of the retainer channel.

13. The apparatus as claimed in claim 12, wherein the one or more engaging members, the one or more first complementary engaging member, and the one or more second complementary engaging members are adhesive tapes adapted to adhesively engage the retainer channel with the first flexible retainer member and the aperture of the support structure.

14. The apparatus as claimed in claim 12, wherein the one or more engaging members, the one or more first complementary engaging member, and the one or more second complementary engaging members are fastener receiving members adapted to receive fasteners, thereby fastening the retainer channel with the first flexible retainer member and the aperture of the support structure.

15. The apparatus as claimed in claim 12, wherein the retainer channel comprises a plurality of second engaging members adapted to be engaged with a plurality of second complementary engaging members of the second flexible retainer member, thereby constraining movement of the second flexible retainer member with respect to the retainer channel.

16. The apparatus as claimed in claim 15, wherein the plurality of second engaging members and the second complementary engaging members are adhesive tapes adapted to adhesively engage the retainer channel with the second flexible retainer member and the aperture of the support structure.

17. The apparatus as claimed in claim 15, wherein the plurality of second engaging members and the plurality of second complementary engaging members are fastener receiving members adapted to receive fasteners, thereby fastening the retainer channel with the second flexible retainer member and the aperture of the support structure.

18. The apparatus as claimed in claim 12, wherein operating at least one of the first and second flexible retainer members in the collapsed form alters the gap defined by the first and second flexible retainer members, thereby allowing insertion of the mouth portion of the trash liner within the interior space of the retainer channel.

19. The apparatus as claimed in claim 18, wherein the mouth portion of the trash liner is secured within the interior space of the retainer channel when at least one of the first and second flexible retainer members attains the retracted form from the collapsed form, and wherein an unsecured portion of the trash liner is disposed within the support structure upon securing the mouth portion of the trash liner within the retainer channel.

20. An apparatus for securing a mouth portion of a trash liner, the apparatus comprising:

a retainer channel comprising an inner surface and an outer surface, a portion of the outer surface disposed to at least a portion of an interior surface proximate to an aperture of a support structure and the inner surface defining an interior space within the retainer channel for receiving the mouth portion of the trash liner therein, the retainer channel further comprising one or more engaging members adapted to engage the portion of the outer surface of the retainer channel with one or more complementary engaging members disposed to the portion of the interior surface, thereby constraining movement of the retainer channel with respect to the aperture of the support structure; and a retainer member comprising one or more flange members, each flange member of the one or more flange members extending downwardly from a bottom portion of the retainer member and oriented along a longitudinal axis of the support structure, wherein the retainer member is configured based on a geometric design of the retainer channel for enabling a snug fit between the retainer member and the retainer channel, wherein the retainer member is configured to removably secure to the retainer channel for retaining the mouth portion of the trash liner there between, while an unsecured portion of the trash liner is disposed within the support structure, and wherein the one or more flange members of the retainer member abut the inner surface of the retainer channel for removably securing the retainer member to a top portion of the retainer channel.

21. The apparatus as claimed in claim 20, wherein any of the one or more engaging members and the one or more complementary engaging members are adhesive tapes adapted to adhesively engage the retainer channel with the aperture of the support structure.

22. The apparatus as claimed in claim 20, wherein the one or more engaging members and the one or more complementary engaging members are fastener receiving members adapted to receive fasteners, thereby engaging the retainer channel with the aperture of the support structure.

* * * * *